United States Patent
Velde et al.

(10) Patent No.: US 11,499,293 B2
(45) Date of Patent: Nov. 15, 2022

(54) WORK VEHICLE MAGNETORHEOLOGICAL FLUID JOYSTICK SYSTEMS PROVIDING IMPLEMENT COMMAND GUIDANCE

(71) Applicant: Deere & Company, Moline, IL (US)

(72) Inventors: Todd F. Velde, Dubuque, IA (US); Benjamin P. Koestler, Asbury, IA (US)

(73) Assignee: DEERE & COMPANY, Moline, IL (US)

(*) Notice: Subject to any disclaimer, the term of this patent is extended or adjusted under 35 U.S.C. 154(b) by 353 days.

(21) Appl. No.: 16/989,427

(22) Filed: Aug. 10, 2020

(65) Prior Publication Data

US 2021/0340725 A1 Nov. 4, 2021

Related U.S. Application Data

(60) Provisional application No. 63/019,083, filed on May 1, 2020.

(51) Int. Cl.
*G05G 9/04* (2006.01)
*B62D 1/12* (2006.01)
(Continued)

(52) U.S. Cl.
CPC .......... *E02F 9/2004* (2013.01); *E02F 9/2012* (2013.01); *E02F 9/2029* (2013.01);
(Continued)

(58) Field of Classification Search
CPC ..... E02F 9/2004; E02F 9/2012; E02F 9/2029; E02F 9/2045; E02F 9/24; E02F 9/261;
(Continued)

(56) References Cited

U.S. PATENT DOCUMENTS

| 7,197,873 B1 | 4/2007 | Windhorst et al. |
|---|---|---|
| 8,066,567 B2 | 11/2011 | Waggoner et al. |

(Continued)

FOREIGN PATENT DOCUMENTS

| CA | 1203605 A | 4/1986 |
|---|---|---|
| CN | 102027268 B | 12/2013 |

(Continued)

OTHER PUBLICATIONS

German Search Report issued in application No. DE102021203189.7 dated Dec. 1, 2021 (04 pages).

(Continued)

*Primary Examiner* — Adam D Rogers
(74) *Attorney, Agent, or Firm* — Klintworth & Rozenblat IP LLP

(57) ABSTRACT

In embodiments, a work vehicle magnetorheological fluid (MRF) joystick system includes a joystick device, an MRF joystick resistance mechanism, a controller architecture, and an implement tracking data source configured to track movement of the implement during operation of the work vehicle. The joystick device includes, in turn, a base housing, a joystick, and a joystick position sensor. The MRF joystick resistance mechanism is controllable to vary an MRF resistance force impeding joystick movement relative to the base housing. The controller architecture is configured to: (i) track movement of the implement relative to a virtual boundary utilizing data provided by the implement tracking data source; and (ii) command the MRF joystick resistance mechanism to vary the MRF resistance force based, at least in part, on implement movement relative to the virtual boundary.

20 Claims, 7 Drawing Sheets

(51) Int. Cl.
| | |
|---|---|
| *E02F 9/24* | (2006.01) |
| *E02F 9/26* | (2006.01) |
| *F16F 9/53* | (2006.01) |
| *E02F 9/20* | (2006.01) |
| *G05G 5/03* | (2008.04) |
| *G05G 9/047* | (2006.01) |
| *G05G 5/12* | (2006.01) |
| *G05G 5/02* | (2006.01) |
| *G06F 3/01* | (2006.01) |
| *F15B 13/01* | (2006.01) |
| *G05G 5/05* | (2006.01) |
| *G05G 1/04* | (2006.01) |

(52) U.S. Cl.
CPC ............... *E02F 9/24* (2013.01); *E02F 9/265* (2013.01); *F15B 13/01* (2013.01); *F16F 9/535* (2013.01); *G05G 5/02* (2013.01); *G05G 5/03* (2013.01); *G05G 5/05* (2013.01); *G05G 5/12* (2013.01); *G05G 9/047* (2013.01); *G06F 3/016* (2013.01); *E02F 9/2045* (2013.01); *E02F 9/261* (2013.01); *G05G 1/04* (2013.01); *G05G 2009/04751* (2013.01); *G05G 2009/04766* (2013.01); *G05G 2505/00* (2013.01)

(58) Field of Classification Search
CPC ........... E02F 9/265; G05G 1/015; G05G 1/04; G05G 5/02; G05G 5/03; G05G 5/05; G05G 5/12; G05G 9/047; G05G 2009/04751; G05G 2009/04766; G05G 2505/00; F15B 13/01; F16F 9/535; G06F 3/016
See application file for complete search history.

(56) References Cited

U.S. PATENT DOCUMENTS

| | | | |
|---|---|---|---|
| 8,639,393 B2 * | 1/2014 | Taylor | G05D 1/0278 701/25 |
| 8,972,125 B1 | 3/2015 | Elliott | |
| 9,141,126 B2 | 9/2015 | Hynes et al. | |
| 9,181,676 B2 | 11/2015 | Meislahn et al. | |
| 9,341,258 B1 | 5/2016 | Templin | |
| 9,771,705 B2 | 9/2017 | Horstman et al. | |
| 9,777,460 B2 | 10/2017 | Wuisan et al. | |
| 9,777,461 B2 | 10/2017 | Wuisan et al. | |
| 9,797,114 B2 | 10/2017 | Maifield et al. | |
| 10,061,343 B2 | 8/2018 | Fredrickson et al. | |
| 10,066,367 B1 * | 9/2018 | Wang | E02F 9/265 |
| 10,119,244 B2 * | 11/2018 | Elkins | B60W 30/10 |
| 10,145,084 B2 | 12/2018 | Fredrickson | |
| 11,048,330 B2 | 6/2021 | Eck et al. | |
| 11,086,350 B2 | 8/2021 | Wakuda et al. | |
| 2001/0052893 A1 | 12/2001 | Jolly et al. | |
| 2003/0098196 A1 | 5/2003 | Yanaka | |
| 2004/0204811 A1 | 10/2004 | Huang et al. | |
| 2004/0221674 A1 | 11/2004 | Kornelson | |
| 2006/0197741 A1 | 9/2006 | Biggadike | |
| 2011/0005344 A1 | 1/2011 | Haevescher | |
| 2013/0229272 A1 | 9/2013 | Elliott | |
| 2016/0179128 A1 | 6/2016 | Guglielmo | |
| 2017/0073935 A1 | 3/2017 | Friend et al. | |
| 2018/0058039 A1 | 3/2018 | Fredrickson et al. | |
| 2019/0071119 A1 | 3/2019 | Takenaka et al. | |
| 2019/0210854 A1 | 7/2019 | Eck et al. | |
| 2019/0286237 A1 | 9/2019 | Eck et al. | |
| 2020/0041331 A1 | 2/2020 | Hoshino et al. | |
| 2020/0125132 A1 | 4/2020 | Wakuda et al. | |
| 2021/0286431 A1 | 9/2021 | Eck et al. | |
| 2021/0340723 A1 | 11/2021 | Velde et al. | |
| 2021/0340724 A1 | 11/2021 | Kenkel et al. | |
| 2021/0340725 A1 | 11/2021 | Velde et al. | |
| 2021/0340726 A1 | 11/2021 | Vandegrift et al. | |
| 2021/0340728 A1 | 11/2021 | Graham et al. | |
| 2021/0341032 A1 | 11/2021 | Velde et al. | |
| 2021/0341033 A1 | 11/2021 | Breutzman et al. | |
| 2021/0341960 A1 | 11/2021 | Kenkel et al. | |

FOREIGN PATENT DOCUMENTS

| | | | | |
|---|---|---|---|---|
| CN | 112267516 A | * | 1/2021 | ............ E02F 9/2045 |
| DE | 19848191 A1 | | 4/2000 | |
| DE | 102004017148 A1 | | 1/2005 | |
| DE | 102004041690 A1 | | 3/2005 | |
| DE | 112009003181 T5 | | 1/2012 | |
| DE | 102012203095 A1 | | 9/2013 | |
| DE | 112013001281 T5 | | 7/2019 | |
| DE | 102020104810 A1 | | 2/2021 | |
| JP | 2014174726 A | | 9/2014 | |
| KR | 20190074555 A | | 6/2019 | |
| WO | 9642078 A1 | | 12/1996 | |
| WO | 2015009161 A1 | | 1/2015 | |

OTHER PUBLICATIONS

German Search Report issued in application No. DE102021203343.1 dated Dec. 2, 2021 (05 pages).
German Search Report issued in application No. DE102021203250.8 dated Dec. 2, 2021 (04 pages).
German Search Report issued in application No. DE102021202960.4 dated Dec. 1, 2021 (04 pages).
German Search Report issued in application No. DE102021203367.9 dated Dec. 1, 2021 (05 pages).
USPTO, Non-Final Office Action issued in Utility U.S. Appl. No. 17/002,052 dated Nov. 8, 2021.
Farzad Ahmadkhanlou, Design, Modeling and Control of Magnetorheological Fluid-Based Force Feedback Dampers for Telerobotic Systems, ResearchGate, https://www.researchgate.net/publication/251697638, Apr. 2008. (19 pages).
Deere & Company, John Deere Motor Grader Left Dual Joystick Controls Tutorial, https://www.youtube.com/watch?v=iYxPlxzD8g4&feature=youtu.be&t=25, Mar. 7, 2017. (2 pages).
MRF Damper, FMR-70S-403 Brochure, undated admitted prior art. (3 pages).
Deere & Company, pending U.S. Appl. No. 63/019,083, filed May 1, 2020.
Deere & Company, pending Utility U.S. Appl. No. 16/864,696, filed May 1, 2020.
Deere & Company, pending Utility U.S. Appl. No. 16/864,726, filed May 1, 2020.
Deere & Company, pending Utility U.S. Appl. No. 16/864,749, filed May 1, 2020.
Deere & Company, pending Utility U.S. Appl. No. 16/916,800, filed Jun. 30, 2020.
Deere & Company, pending Utility U.S. Appl. No. 16/922,321, filed Jul. 7, 2020.
Deere & Company, pending Utility U.S. Appl. No. 17/002,052, filed Aug. 25, 2020.
Deere & Company, pending Utility U.S. Appl. No. 17/038,399, filed Sep. 30, 2020.
Non-Final Office Action issued in Utility U.S. Appl. No. 16/864,696 dated Sep. 16, 2021.
USPTO, Non-Final Office Action issued in Utility U.S. Appl. No. 16/916,800 dated Jun. 22, 2022.
German Search Report issued in application No. DE102021203807.7 dated Jan. 26, 2022 with English translation (11 pages).
German Search Report issued in application No. DE102021203860.3 dated Jan. 28, 2022 with English translation (11 pages).
USPTO, Non-Final Office Action issued in Utility U.S. Appl. No. 16/864,749 dated Sep. 8, 2022.

* cited by examiner

Example Work Vehicle

Example MRF Joystick Device(s)

WORK VEHICLE MAGNETORHEOLOGICAL FLUID JOYSTICK SYSTEMS PROVIDING IMPLEMENT COMMAND GUIDANCE

CROSS-REFERENCE TO RELATED APPLICATION(S)

This application claims priority to U.S. provisional application Ser. No. 63/019,083, filed with the United Stated Patent and Trademark Office on May 1, 2020.

STATEMENT OF FEDERALLY SPONSORED RESEARCH OR DEVELOPMENT

Not applicable.

FIELD OF THE DISCLOSURE

This disclosure relates to work vehicle magnetorheological fluid (MRF) joystick systems, which guide joystick-controlled positioning of work vehicle implements through variations in MRF-applied forces resisting joystick motions.

BACKGROUND OF THE DISCLOSURE

Joystick devices are commonly utilized to control various operational aspects of work vehicles employed within the construction, agriculture, forestry, and mining industries. For example, in the case of a work vehicle equipped with a boom assembly, an operator may utilize one or more joystick devices to control boom assembly movement and, therefore, movement of a tool or implement mounted to the outer terminal end of the boom assembly. Common examples of work vehicles having such joystick-controlled boom assemblies include excavators, feller bunchers, skidders, tractors (on which modular front end loader and backhoe attachments may be installed), tractor loaders, wheel loaders, and various compact loaders. Similarly, in the case of dozers, motor graders, and other work vehicles equipped with earth-moving blades, an operator may interface with one or more joysticks to control blade movement and positioning. Joystick devices are also commonly utilized to steer or otherwise control the directional movement of the work vehicle chassis itself as in the case of motor graders, dozers, and certain loaders, such as skid steer loaders. Given the prevalence of joystick devices within work vehicles, taken in combination with the relatively challenging, dynamic environments in which work vehicles often operate, a continued demand exists for advancements in the design and function of work vehicle joystick systems, particularly to the extent that such advancements can improve the safety and efficiency of work vehicle operation.

SUMMARY OF THE DISCLOSURE

A work vehicle magnetorheological fluid (MRF) joystick system is disclosed for usage onboard a work vehicle. In embodiments, the work MRF joystick system includes a joystick device, an implement tracking data source, an MRF joystick resistance mechanism, and a controller architecture. The joystick device includes, in turn, a base housing, a joystick mounted to the base housing and movable with respect thereto, and a joystick position sensor configured to monitor joystick movement relative to the base housing. The implement tracking data source is configured to track movement of the implement during operation of the work vehicle, while the MRF joystick resistance mechanism is controllable to vary an MRF resistance force impeding joystick movement relative to the base housing. A controller architecture is coupled to the MRF joystick resistance mechanism, to the joystick position sensor, and to the implement tracking data source. The controller architecture is configured to: (i) track movement of the implement relative to a virtual boundary utilizing data provided by the implement tracking data source; and (ii) command the MRF joystick resistance mechanism to vary the MRF resistance force based, at least in part, on implement movement relative to the virtual boundary.

In further embodiments, the work vehicle MRF joystick system includes a joystick device, an MRF joystick resistance mechanism, and a controller architecture. The joystick device has a base housing, a joystick mounted to the base housing and movable with respect thereto, and a joystick position sensor configured to monitor joystick movement relative to the base housing. The MRF joystick resistance mechanism is at least partially integrated into the base housing and is controllable to selectively resist movement of the joystick relative to the base housing. Coupled to the MRF joystick resistance mechanism and to the joystick position sensor, the controller architecture is configured to: (i) when detecting operator movement of the joystick in an operator input direction, determine whether continued joystick movement in the operator input direction will result in imminent breach of a first virtual boundary by the implement; and (ii) when determining that continued joystick movement in the operator input direction will result in imminent breach of the first virtual boundary by the implement, command the MRF joystick resistance mechanism to generate a first MRF resistance force impeding continued joystick movement in the operator input direction.

In still further implementations, the MRF joystick system contains a joystick device including a joystick rotatable relative to a base housing, an MRF joystick resistance mechanism controllable to selectively resist rotation of the joystick relative to the base housing about at least one axis, and an implement tracking data source configured to track movement of the implement during operation of the work vehicle. A controller architecture is coupled to the joystick device, to the MRF joystick resistance mechanism, and to the implement tracking data source. The controller architecture is configured to: (i) when an operator commands movement of the implement utilizing the joystick device, track movement of the implement relative to at least a first virtual boundary; and (ii) command the MRF joystick resistance mechanism to vary an MRF resistance force impeding joystick movement in at least one degree of freedom to provide tactile feedback to the operator indicative of a proximity of the implement to the first virtual boundary.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
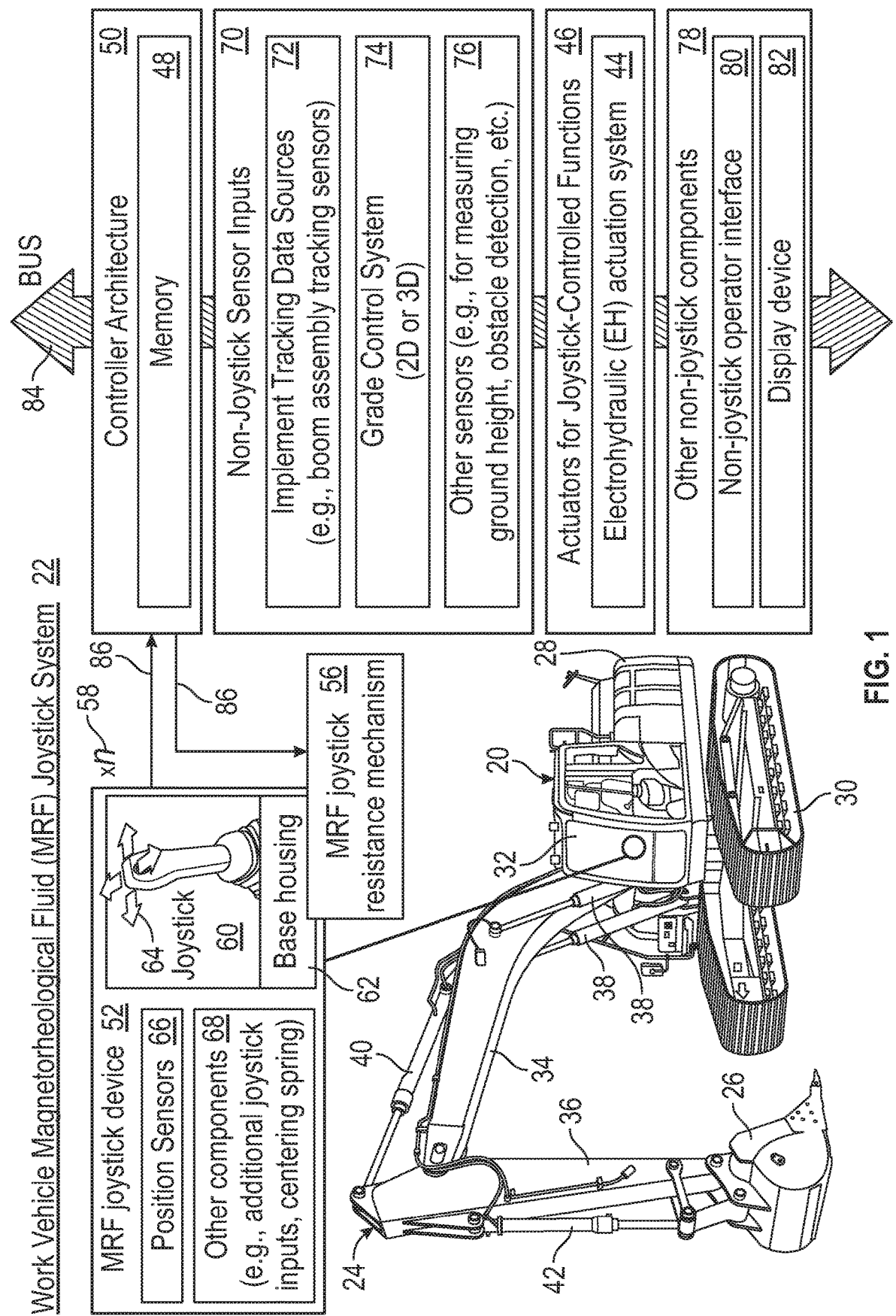
FIG. 1 is a schematic of an example magnetorheological fluid (MRF) joystick system onboard a work vehicle (here, an excavator), as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims. As appearing herein, the term "work vehicle" includes all parts of a work vehicle. Thus, in implementations in which a boom assembly terminating in an implement is attached to the chassis of a work vehicle, the term "work vehicle" encompasses both the chassis and the boom assembly, as well as the implement mounted to the terminal end of the boom assembly.

OVERVIEW

The following discloses work vehicle magnetorheological fluid (MRF) joystick systems providing implement command guidance through controlled variations in MRF-applied resistance forces, which impede joystick motion in one or more degrees of freedom (DOFs). Embodiments of the MRF joystick system include a processing sub-system or "controller architecture," which is operably coupled to an MRF joystick resistance mechanism; that is, a mechanism, device, or damper containing a magnetorheological fluid and capable of modifying the rheology (viscosity) of the fluid through variations in the strength of an electromagnetic (EM) field to provide controlled adjustments to the resistive force impeding joystick motion in at least one DOF. This resistive force is referred to herein as an "MRF resistance force," while the degree to which an MRF resistance force impedes joystick motion in a particular direction or combination of directions is referred to as the "joystick stiffness" in the relevant direction(s).

During operation of the MRF joystick system, the controller architecture provides the desired implement command guidance through variations in the MRF resistance force inhibiting joystick movement. Specifically, in embodiments of the MRF joystick system, the controller architecture may command the MRF joystick resistance mechanism to vary the MRF resistance force as a function of joystick-controlled implement movement relative to one or more virtual boundaries. When joystick movement occurs in a particular direction (herein, the "operator input direction"), the controller architecture determines whether continued joystick movement in the operator input direction will bring the implement into a predetermined proximity of one or more virtual boundaries established by the controller in a three dimensional (3D) volume of space. If determining that continued joystick movement in the operator input direction will bring the implement into a predetermined proximity of a virtual boundary, the controller architecture commands the MRF joystick resistance mechanism to generate an MRF resistance force deterring continued joystick movement in the operator input direction. In so doing, the MRF joystick system provides a tactile cue through the relevant joystick and to operator to slow, if not halt movement of the joystick in the operator input direction.

The controller architecture may repeat the above-described process to gradually increase the joystick resistance force should the operator continue to rotate (or otherwise move) the joystick in the operator input direction. For example, in one approach, the controller architecture commands the MRF joystick resistance mechanism to increase the magnitude of an MRF resistance force resisting joystick motion in an operator input direction as a joystick-controlled implement approaches a nearby virtual boundary, with the MRF resistance force increasing substantially proportionally to the decreasing distance or separation between the implement and the virtual boundary. Additionally or alternatively, the controller architecture may determine when breach of a virtual boundary by a joystick-controlled implement is imminent; e.g., predicted to occur within a relatively short timeframe on the order of, for example, one second or less. When determining that the breach of a virtual boundary by the implement is imminent, the controller architecture may command the MRF joystick resistance mechanism to generate a maximum MRF resistance force impeding further joystick motion in the operator input direction. In embodiments, the maximum MRF resistance force may be sufficient to fully arrest joystick motion in the operator input direction, or at least render such joystick motion relatively difficult, to further discourage, if not prevent breach of the virtual boundary by the implement. In still other instances, the controller architecture may generate a tactile cue, such as a brief resistance pulse or feel detent, when the implement breaches such a virtual boundary.

The above-described MRF-based joystick guidance scheme and the corresponding virtual boundaries are usefully established in various operational scenarios. For example, such virtual boundaries may be beneficially utilized in conjunction with the operation of a dozer, a motor grader, an excavator, a backhoe, or similar work vehicle equipped with an (e.g., integrated) grade control system, with the MRF joystick system providing MRF-generated tactile feedback to aid an operator in positioning an implement in a manner imparting a ground surface with a desired grade or topology. Specifically, in such embodiments, elevation coordinates defined by design data loaded into the work vehicle's onboard computer may be utilized to establish such virtual boundaries and generate varying MRF resistance effects based upon the proximity of the (e.g., cutting edge) of the implement relative thereto. Similarly, in other excavation operations, virtual boundaries can be established corresponding to the surfaces of a trench or other excavation feature desirably created utilizing a digging tool or excavation implement of the work vehicle. For example, in at least some embodiments, a virtual boundary may be established in the form of a two dimensional (2D) or 3D excavation floor, which may represent a lower threshold beneath with further excavation is desirably avoided. In still other instances, the controller of the MRF joystick system may establish virtual boundaries around or adjacent obstacles, such as buried pipes or electrical conduits, to prevent, or at least deter, operator joystick commands that may otherwise bring an implement undesirably close to or in contact with such obstacles during performance of an excavation task. The below-described virtual boundaries can also be utilized to help guide joystick-controlled implement movement during non-excavation work tasks, as well. For example, in this latter regard, a virtual boundary in the form of a virtual ceiling may be established to limit the above-ground height to which a bucket or other implement may be raised; e.g., as may be useful when a work vehicle, such as a tractor equipped with a Front End Loader (FEL) attachment, operates in an enclosed structure (e.g., a barn), a mine, or a work area in which overhead obstacles are present.

In the above-described manner, embodiments of the MRF joystick system provide intuitive tactile guidance during joystick-controlled movement of an implement to enhance operator awareness of implement movement relative to one or more virtual boundaries. This, in turn, may assist or guide an operator in commanding implement movement with higher degrees of precision, improved efficiencies, and with a decreased likelihood of unintended or problematic implement movements. Further, the usage of MRF technology to guide joystick input motions provides several benefits over the usage of other mechanisms (e.g., brake mechanisms and artificial force feedback (AFF) motors) potentially capable of selectively restricting joystick motions. As one such benefit, the rheological properties (e.g., viscosity) of a given magnetorheological fluid often can be adjusted in relatively precise, pronounced, and rapid manner through variations in the strength of the EM field in which the magnetorheological fluid is immersed. As the strength of an EM field can likewise be varied in a controlled and responsive manner, the MRF joystick resistance can provide highly abbreviated, low lag response times on the order of, for example, a few milliseconds (ms) or less. Further, the MRF joystick resistance mechanism may be capable of precisely varying the strength of the MRF resistance force over an essentially continuous range. These characteristics allow the MRF joystick device to generate various different tactile resistance effects perceptible to work vehicle operators, including the selective application of detents and continuous variations in the MRF resistance force inhibiting joystick motion in a particular direction. As a still further benefit, the MRF joystick system may provide reliable, low noise operation, while incorporating the usage of non-toxic (e.g., carbonyl iron-containing) magnetorheological fluids.

An example embodiment of a work vehicle MRF joystick system will now be described in conjunction with FIGS. 1-6. In the below-described example, the MRF joystick system is principally discussed in the context of a particular type of work vehicle, namely, an excavator. Additionally, in the following example, the MRF joystick system includes two joystick devices, which each have a joystick rotatable about two perpendicular axes and which are utilized to control movement of the excavator boom assembly and the implement (e.g., bucket) attached thereto. The following example notwithstanding, the MRF joystick system may include a greater or lesser number of joysticks in further implementations, with each joystick device movably in any number of DOFs and along any suitable motion pattern; e.g., in alternative embodiments, a given joystick may be rotatable about a single axis or, perhaps, may be restricted to movement along a predefined track (e.g., H-shaped track) or motion pattern. Moreover, the below-described MRF joystick system can be deployed on wide range of work vehicles including joystick-controlled functions, additional examples of which are discussed below in connection with FIG. 7.

Example MRF Joystick System Providing Implement Command Guidance

Referring initially to FIG. 1, an example work vehicle (here, an excavator 20) equipped with a work vehicle MRF joystick system 22 is presented. In addition to the MRF joystick system 22, the excavator 20 includes a boom assembly 24 terminating in a tool or implement, such a bucket 26. Various other implements can be interchanged with the bucket 26 and attached to the terminal end of the boom assembly 24 including, for example, other buckets, grapples, and hammers. The excavator 20 features a body or chassis 28, a tracked undercarriage 30 supporting the chassis 28, and a cabin 32 located at forward portion of the chassis 28 and enclosing an operator station. The excavator boom assembly 24 extends from the chassis 28 and contains, as principal structural components, an inner or proximal boom 34 (hereafter, "the hoist boom 34"), an outer or distal boom 36 (hereafter, "the dipperstick 36"), and a number of hydraulic cylinders 38, 40, 42. The hydraulic cylinders 38, 40, 42 include, in turn, two hoist cylinders 38, a dipperstick cylinder 40, and a bucket cylinder 42. Extension and retraction of the hoist cylinders 38 rotates the hoist boom 34 about a first pivot joint at which the hoist boom 34 is joined to the excavator chassis 28, here at location adjacent (to the right of) the cabin 32. Extension and retraction of the dipperstick cylinder 40 rotates the dipperstick 36 about a second pivot joint at which the dipperstick 36 is joined to the hoist boom 34. Finally, extension and retraction of the bucket cylinder 42 rotates or "curls" the excavator bucket 26 about a third pivot joint at which the bucket 26 is joined to the dipperstick 36.

The hydraulic cylinders 38, 40, 42 are included in an electrohydraulic (EH) actuation system 44, which is encompassed by a box 46 entitled "actuators for joystick-controlled functions" in FIG. 1. Movements of the excavator boom assembly 24 are controlled utilizing at least one joystick located within the excavator cabin 32 and included in the MRF joystick system 22. Specifically, an operator may utilize the joystick or joysticks included in the MRF joystick system 22 to control the extension and retraction of the hydraulic cylinders 38, 40, 42, as well as to control the swing action of the boom assembly 24 via rotation of the excavator chassis 28 relative to the tracked undercarriage 30. The depicted EH actuation system 44 also contains various other non-illustrated hydraulic components, which may include flow lines (e.g., flexible hoses), check or relief valves, pumps, a, fittings, filters, and the like. Additionally, the EH actuation system 44 contains electronic valve actuators and flow control valves, such as spool-type multi-way valves, which can be modulated to regulate the flow of pressurized hydraulic fluid to and from the hydraulic cylinders 38, 40, 42. This stated, the particular construction or architecture of the EH actuation system 44 is largely inconsequential to embodiments of the present disclosure, providing that the below-described controller architecture 50 is capable of controlling movement of the boom assembly 24 via commands transmitted to selected ones of the actuators 46 effectuating the joystick controlled functions of the excavator 20.

As schematically illustrated in an upper left portion of FIG. 1, the work vehicle MRF joystick system 22 contains one or more MRF joystick devices 52, 54. As appearing herein, the term "MRF joystick device" refers to an operator input device including at least one joystick or control lever, the movement of which can be selectively impeded utilizing an MRF joystick resistance mechanism of the type described herein. While one such MRF joystick device 52 is schematically shown in FIG. 1 for clarity, the MRF joystick system 22 can include any practical number of joystick devices, as indicated by symbol 58. In the case of the example excavator 20, the MRF joystick system 22 will typically include two joystick devices; e.g., joystick devices 52, 54 described below in connection with FIG. 2. The manner in which two such joystick devices 52, 54 may be utilized to control movement of the excavator boom assembly 24 is further discussed below. First, however, a general discussion of the joystick device 52, as schematically illustrated in FIG. 1, is provided to establish a general framework in which embodiments of the present disclosure may be better understood.

As schematically illustrated in FIG. 1, the MRF joystick device 52 includes a joystick 60 mounted to a lower support structure or base housing 62. The joystick 60 is movable relative to the base housing 62 in at least one DOF and may be rotatable relative to the base housing 62 about one or more axes. In the depicted embodiment, and as indicated by arrows 64, the joystick 60 of the MRF joystick device 52 is rotatable relative to the base housing 62 about two perpendicular axes and will be described below as such. The MRF joystick device 52 includes one or more joystick position sensors 66 for monitoring the current position and movement of the joystick 60 relative to the base housing 62. Various other components 68 may also be included in the MRF joystick device 52 including buttons, dials, switches, or other manual input features, which may be located on the joystick 60 itself, located on the base housing 62, or a combination thereof. Spring elements (gas or mechanical), magnets, or fluid dampers may be incorporated into the joystick device 52 to provide a desired rate of return to a home position of the joystick, as well as to fine-tune the desired feel or "stiffness" of the joystick 60 perceived by an operator when interacting with the MRF joystick device 52. In more complex components, various other components (e.g., potentially including one or more AFF motors) can also be incorporated into the MRF joystick device 52. In other implementations, such components may be omitted from the MRF joystick device 52.

An MRF joystick resistance mechanism 56 is at least partially integrated into the base housing 62 of the MRF joystick device 52. The MRF joystick resistance mechanism 56 (and the other MRF joystick resistance mechanisms mentioned in this document) may also alternatively be referred to as an "MRF damper," as an "MRF brake device," or simply as an "MRF device." The MRF joystick resistance mechanism 56 can be controlled to adjust the MRF resistance force and, therefore, joystick stiffness resisting joystick motion relative to the base housing 62 in at least one DOF. During operation of the MRF joystick system 22, the controller architecture 50 may selectively command the MRF joystick resistance mechanism 56 to increase the joystick stiffness impeding joystick rotation about a particular axis or combination of axes. As discussed more fully below, the controller architecture 50 may command the MRF joystick resistance mechanism 56 to apply such an MRF resistance force by increasing the strength of an EM field in which a magnetorheological fluid contained in the mechanism 56 is at least partially immersed. A generalized example of one manner in which the MRF joystick resistance mechanism 56 may be realized is described below in connection with FIGS. 3 and 4. The controller architecture 50 may command the MRF motion resistance mechanism 56 to generate such an MRF resistance force when determining that continued rotation of the joystick 60 in a particular direction (herein, the "operator input direction") will result in implement movement into a defined proximity of a virtual boundary or virtual boundary breach. In the case of the excavator 20, in particular, the controller architecture 50 determines whether continued rotation of the joystick 60 included in the MRF joystick device 52 (and/or continued rotation of another joystick included in a second, similar MRF joystick device) will result in movement of the bucket 26 (or another portion of the boom assembly 24) into a defined proximity of a virtual boundary and/or will result in movement of the bucket 26 through a virtual boundary.

In projecting the manner in which rotation of the joystick 60 (and/or a second joystick included in the MRF joystick system 22) will result in movement of the excavator boom assembly 24 relative to the virtual boundary or boundaries at issue, the controller architecture 50 considers input from multiple data sources including a number of non-joystick sensors 70 onboard the excavator 20. Such non-joystick sensors 70 may include sensors contained in implement tracking data sources 72 can include any sensors or data sources providing information pertaining to changes in the position, speed, heading, or orientation of the excavator 20. Sensor systems suitable for monitoring the position and movement of the excavator chassis 28 include GPS modules, sensors from which the rotational rate of the undercarriage tracks may be calculated, electronic compasses, and MEMS devices, such as accelerometers and gyroscopes, which may be packaged as one or more IMUs. Similarly, the orientation of the excavator chassis 28 relative to gravity (or another reference direction) may be monitored utilizing one or more MEMS devices or tilt sensors (inclinometers) affixed to the chassis 28 in embodiments.

The implement tracking data sources 72 may further include any number and type of boom assembly tracking sensors suitable tracking the position and movement of the excavator boom assembly 24. Such sensors can include rotary or linear variable displacement transducers integrated into excavator boom assembly 24 in embodiments. For example, in one possible implementation, rotary position sensors may be integrated into the pivot joints of the boom assembly 24; and the angular displacement readings captured by the rotary position sensors, taken in conjunction with known dimensions of the boom assembly 24 (as recalled from the memory 48), may be utilized to track the posture and position of the boom assembly 24 (including the bucket 26) in three dimensional space. In other instances, the extension and reaction of the hydraulic cylinders 38, 40, 42 may be measured (e.g., utilizing linear variable displacement transducers) and utilized to calculate the current posture and positioning of the excavator boom assembly 24. Other sensor inputs can also be considered by the controller architecture 50 in addition or lieu of the aforementioned sensor readings, such as inertia-based sensor readings (as captured by IMUs incorporated into the boom assembly 24) and/or vision system tracking of the excavation implement, to list but a few examples.

In embodiments, the excavator 20 may be further equipped with a grade control system 74. Such a grade control system 74 may be integrated into the excavator; or, instead, added thereto via aftermarket equipment modifications; e.g., retrofit of external masts and cables. The grade control system 74 may be a two dimensional or three dimensional system, which utilized design data to calculate a cutting-edge position of the work vehicle implement (e.g., the bucket 26) based upon the current position of the implement and, more generally, the work vehicle in a real-world context. Often, this is accomplished by loading data files containing desired topography layouts onto the work vehicle computer systems and correlating the desired topography layout with machine position monitored utilizing, for example, a GPS module onboard the work vehicle. Visual guidance may then be generated (e.g., on the below-described display device 82) on which an operator may rely when controlling the work vehicle to position the cutting edge of the implement in a manner appropriate to achieve a desired grade. Such systems are now deployed onboard excavators, dozers, motor graders, and similar work vehicles commonly utilized for excavation purposes.

The non-joystick sensor inputs 70 may further include one or more sensors providing data indicative of the local ground level or height. For example, in embodiments, the excavator 20 may be equipped with relatively comprehensive (e.g., 360 degree) obstacle detection systems, which provide highly accurate, broad coverage detection of obstacles in proximity of the work vehicle using, for example, lidar, radar, or ultrasonic sensors arrays. When present, such as obstacle detection system may be utilized by the controller architecture 50 to estimate the excavation ground height to the chassis 28 of the excavator 20. In other instances, controller architecture 50 may estimate ground in a different manner; e.g., by estimate the excavation ground height utilizing a calibration process in which an operator sets the bucket 26 onto the ground and then position of the bucket 26 is estimated. Such data may be useful to, for example, allow an operator to specify a desired vertical location of a virtual ceiling or virtual floor defining the upper or lower boundaries of an operational envelope, respectively, by entering data indicating a height-above-ground or a height-below-ground of such boundaries.

In various implementations, the non-joystick sensor inputs 70 may also include sensors involved in obstacle detection. Such sensors may be included in an obstacle detection system, which provides relative broad coverage detection (e.g., 360 degree detection) of obstacles in proximity of the work vehicle using, for example, lidar, radar, or ultrasonic sensors arrays. Such an obstacle detection system may also detect obstacles within the vicinity of the excavator 20 through visual analysis or image processing of live camera feeds supplied by one or more cameras positioned about the excavator 20 in embodiments. This obstacle detection data, as collected by an obstacle detection system onboard the excavator 20, may then be placed on a vehicle bus (e.g., the below-described CAN bus 84) or may otherwise be provided to the controller architecture 50 for consideration in embodiments in which the excavator 20 established one or more virtual boundaries to relative to such obstacles, as further discussed below. Similarly, in embodiments, the controller architecture 50 may recall data from the memory 48 mapping the location of obstacles in the vicinity of the excavator 20, which may be correlated to excavator position utilizing GPS or another tracking approach. For example, such obstacles may include buried pipes, electrical conduits, or other such structures, which are desirable avoided during excavation tasks performed utilizing the excavator 20. Utilizing such obstacle mapping Data recalled from memory 48, as georeferenced to the current excavator position, the controller architecture 50 may establish virtual walls defining or bordering an operational envelope in which the bucket 26 is desirable maintained when, for example, digging a trench or other excavation feature at a location adjacent a buried object.

Embodiments of the MRF joystick system 22 may further include any number of additional non-joystick components 78, such as an operator interface 80, a display device 82 located in the excavator cabin 32, and various other non-illustrated componentry of the type commonly included in work vehicles. The operator interface 80, in particular, can include any number and type of non joystick input devices for receiving operator input, such as buttons, switches, knobs, and similar manual inputs external to the MRF joystick device 52. Such input devices included in the operator interface 80 can also include cursor-type input devices, such as a trackball or joystick, for interacting with a graphical user interface (GUI) generated on the display device 82. The display device 82 may be located within the cabin 32 and may assume the form of any image-generating device on which visual alerts and other information may be visually presented. The display device 82 may also generate a GUI for receiving operator input or may include other inputs (e.g., buttons or switches) for receiving operator input, which may be pertinent to the controller architecture 50 when performing the below-described processes. In certain instances, the display device 82 may also have touch input capabilities.

As further schematically depicted in FIG. 1, the controller architecture 50 is associated with a memory 48 and may communicate with the various illustrated components over any number of wired data connections, wireless data connections, or any combination thereof; e.g., as generically illustrated, the controller architecture 50 may receive data from various components over a centralized vehicle bus, such as a controller area network (CAN) bus 84. The term "controller architecture," as appearing herein, is utilized in a non-limiting sense to generally refer to the processing subsystem of a work vehicle MRF joystick system, such as the example MRF joystick system 22. Accordingly, the controller architecture 50 can encompass or may be associated with any practical number of processors, individual controllers, computer-readable memories, power supplies, storage devices, interface cards, and other standardized components. In many instances, the controller architecture 50 may include a local controller directly associated with the joystick interface and other controllers located within the operator station enclosed by the cabin 32, with the local controller communicating with other controllers onboard the excavator 20 as needed. The controller architecture 50 may also include or cooperate with any number of firmware and software programs or computer-readable instructions designed to carry-out the various process tasks, calculations, and control functions described herein. Such computer-readable instructions may be stored within a non-volatile sector of the memory 48 associated with (accessible to) the controller architecture 50. While generically illustrated in FIG. 1 as a single block, the memory 48 can encompass any number and type of storage media suitable for storing computer-readable code or instructions, as well as other data utilized to support the operation of the MRF joystick system 22. The memory 48 may be integrated into the controller architecture 50 in embodiments as, for example, a system-in-package, a system-on-a-chip, or another type of microelectronic package or module.

Figure 2:
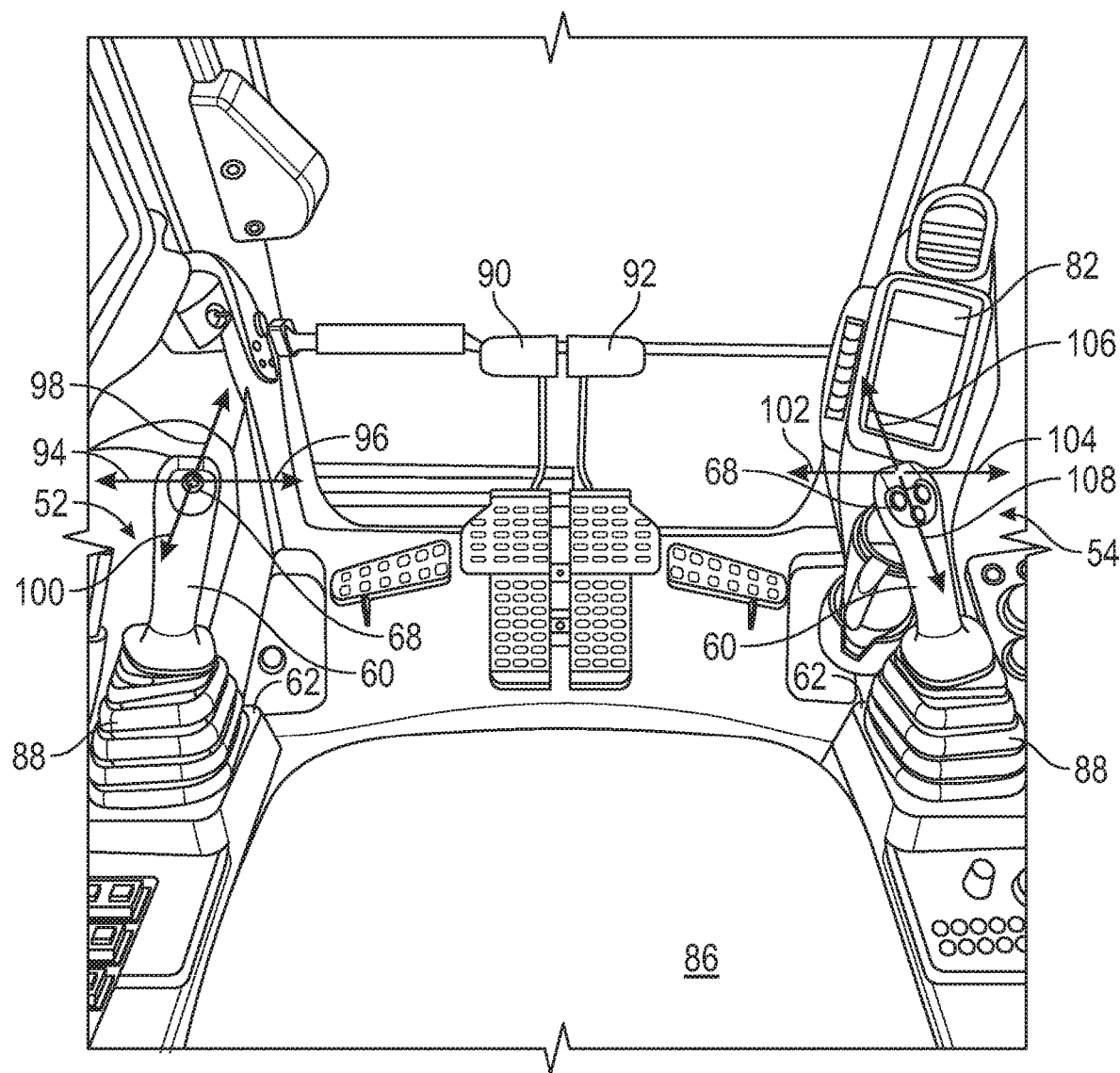
FIG. 2 is a perspective view from within the excavator cabin shown in FIG. 1 illustrating two joystick devices, which may be included in the example MRF joystick system and utilized by an operator to control movement of the excavator boom assembly.

Discussing the joystick configuration or layout of the excavator 20 in greater detail, the number of joystick devices included in the MRF joystick system 22, and the structural aspects and function of such joysticks, will vary amongst embodiments. As previously mentioned, although only a single joystick device 52 is schematically shown in FIG. 1, the MRF joystick system 22 will typically two joystick devices 52, 54 supporting excavator boom assembly control. Further illustrating this point, FIG. 2 provides a perspective view from within the excavator cabin 32 and depicting two MRF joystick devices 52, 54 suitably included in embodiments of the MRF joystick system 22. As can be seen, the MRF joystick devices 52, 54 are positioned on opposing sides of an operator seat 86 such that an operator, using both hands, can concurrently manipulate both the left MRF joystick device 52 and the right joystick device 54 with relative ease. Carrying forward the reference numerals introduced above in connection with FIG. 1, each joystick device 52, 54 includes a joystick 60 mounted to a lower support structure or base housing 62 for rotation relative to the base housing 62 about two perpendicular axes. The joystick devices 52, 54 also each include a flexible cover or boot 88 joined between a lower portion of the joysticks 60 and their respective base housings 62. Additional joystick inputs are also provided on each joystick 60 in the form of thumb-accessible buttons and, perhaps, as other non-illustrated manual inputs (e.g., buttons, dials, and or switches) provided on the base housings 62. Other notable features of the excavator 20 shown in FIG. 2 include the previously-mentioned display device 82 and pedal/control lever mechanisms 90, 92 for controlling the respective movement of the right and left tracks of the tracked undercarriage 30.

Different control schemes can be utilized to translate movement of the joysticks 60 included in the joystick devices 52, 54 to corresponding movement of the excavator boom assembly 24. In many instances, the excavator 20 will support boom assembly control in either (and often allow switching between) a "backhoe control" or "SAE control" pattern and an "International Standard Organization" or "ISO" control pattern. In the case of the backhoe control pattern, movement of the left joystick 60 to the operator's left (arrow 94) swings the excavator boom assembly 24 in a leftward direction (corresponding to counter-clockwise rotation of the chassis 28 relative to the tracked undercarriage 30), movement of the left joystick 60 to the operator's right (arrow 96) swings the boom assembly 24 in a rightward direction (corresponding to clockwise rotation of the chassis 28 relative to the tracked undercarriage 30), movement of the left joystick 60 in a forward direction (arrow 98) lowers the hoist boom 34, and movement of the left joystick 60 in an aft or rearward direction (arrow 100) raises the hoist boom 34. Also, in the case of the backhoe control pattern, movement of the right joystick 60 to the left (arrow 102) curls the bucket 26 inwardly, movement of the right joystick 60 to the right (arrow 104) uncurls or "opens" the bucket 26, movement of the right joystick 60 in a forward direction (arrow 106) rotates the dipperstick 36 outwardly, and movement of the right joystick 60 in an aft direction (arrow 108) rotates the dipperstick 36 inwardly. Comparatively, in the case of an ISO control pattern, the joystick motions for the swing commands and the bucket curl commands are unchanged, while the joystick mappings of the hoist boom and dipperstick are reversed. Thus, in the ISO control pattern, forward and aft movement of the left joystick 60 controls the dipperstick rotation in the previously described manner, while forward and aft movement of the right joystick 60 controls motion (raising and lowering) of the hoist boom 34 in the manner described above.

Figure 3:
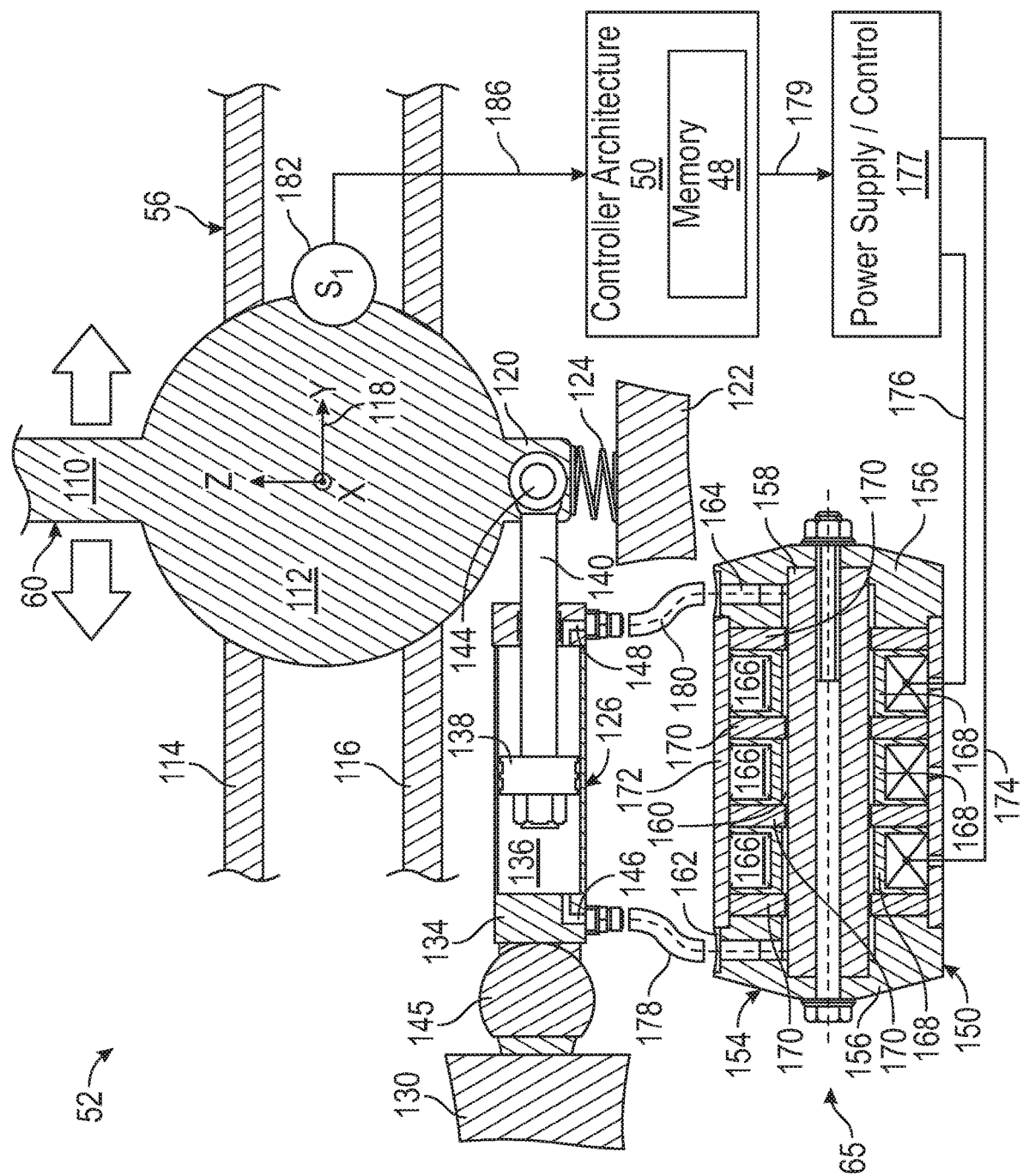
FIGS. 3 and 4 are cross-sectional schematics of the example MRF joystick system, as partially shown and taken along perpendicular section planes through a joystick, illustrating one possible construction of the MRF joystick system.
Figure 4:
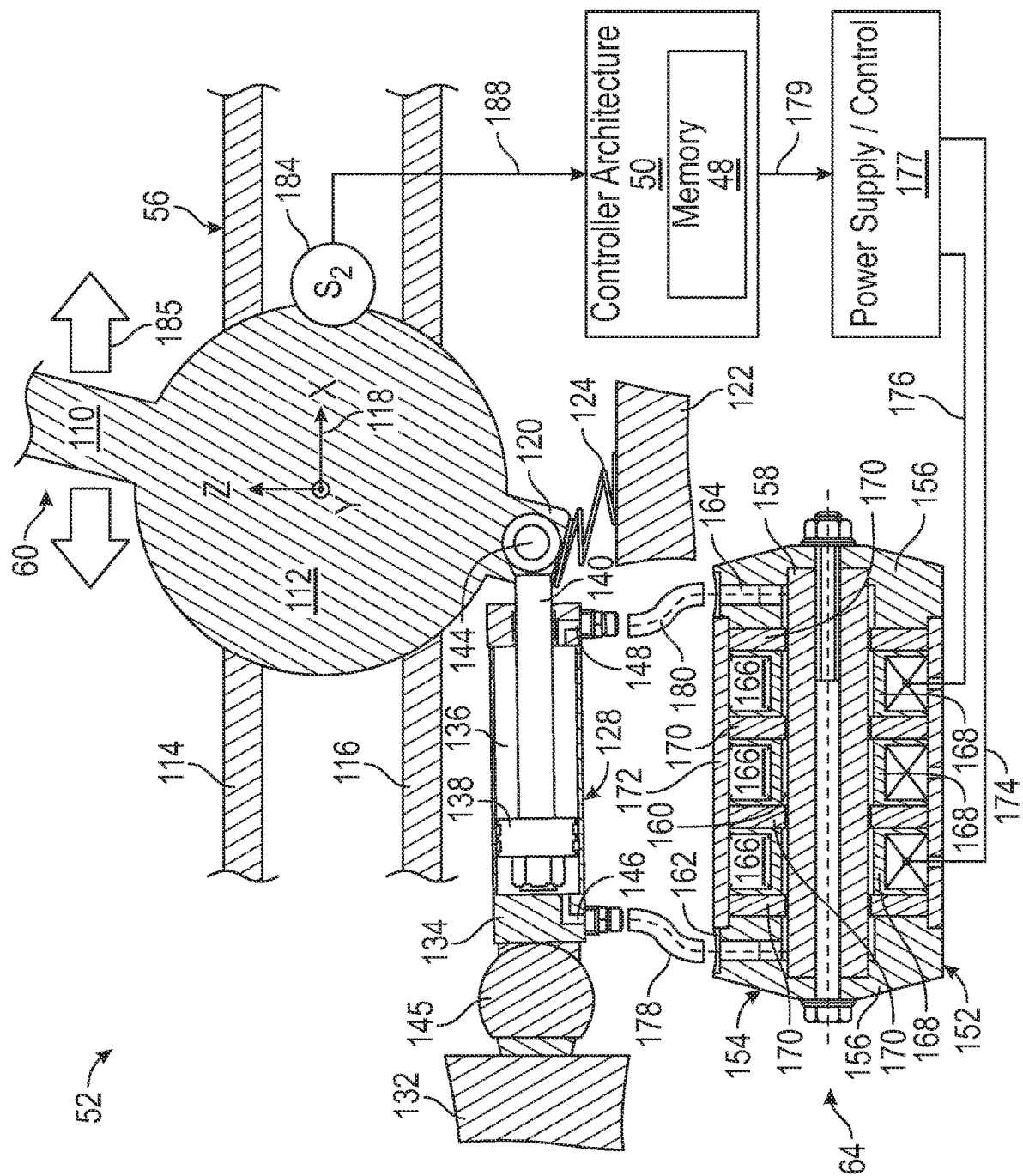

Turning now to FIGS. 3 and 4, an example construction of the MRF joystick device 52 and the MRF joystick resistance mechanism 56 is represented by two simplified cross-sectional schematics. While these drawing figures illustrate a single MRF joystick device (i.e., the MRF joystick device 52), the following description is equally applicable to the other MRF joystick device 54 included in the example MRF joystick system 22. The following description is provided by way of non-limiting example only, noting that numerous different joystick designs incorporating or functionally cooperating with MRF joystick resistance mechanisms are possible. So too is the particular composition of the magnetorheological fluid largely inconsequential to embodiments of the present disclosure, providing that meaningful variations in the rheological properties (viscosity) of the magnetorheological fluid occur in conjunction with controlled variations in EM field strength, as described below. For completeness, however, is noted that one magnetorheological fluid composition well-suited for usage in embodiments of the present disclosure contains magnetically-permeable (e.g., carbonyl iron) particles dispersed in a carrier fluid, which is predominately composed of an oil or an alcohol (e.g., glycol) by weight. Such magnetically-permeable particles may have an average diameter (or other maximum cross-sectional dimension if the particles possess a non-spherical (e.g., oblong) shape) in the micron range; e.g., in one embodiment, spherical magnetically-permeable particles are used having an average diameter between one and ten microns. Various other additives, such as dispersants or thinners, may also be included in the magnetorheological fluid to fine-tune the properties thereof.

Referring now to the example joystick construction shown in FIGS. 3 and 4, and again carrying forward the previously-introduced reference numerals as appropriate, the MRF joystick device 52 includes a joystick 60 having at least two distinct portions or structural regions: an upper handle 110 (only a simplified, lower portion of which is shown in the drawing figures) and a lower, generally spherical base portion 112 (hereafter, the "generally spherical base 112"). The generally spherical base 112 of the joystick 60 is captured between two walls 114, 116 of the base housing 62, which may extend substantially parallel to one another to form an upper portion of the base housing 62. Vertically-aligned central openings are provided through the housing walls 114, 116, with the respective diameters of the central openings dimensioned to be less than the diameter of the generally spherical base 112. The spacing or vertical offset between the walls 114, 116 is further selected such that the bulk of generally spherical base 112 is captured between the vertically-spaced housing walls 114, 116 to form a ball-and-socket type joint. This permits rotation of the joystick 60 relative to the base housing 62 about two perpendicular axes, which correspond to the X- and Y-axes of a coordinate legend 118 appearing in FIGS. 3 and 4; while generally preventing translational movement of the joystick 60 along the X-, Y-, and Z-axes of the coordinate legend 118. In further embodiments, various other mechanical arrangements can be employed to mount a joystick to a base housing, while allowing rotation of the joystick about two perpendicular axes, such as a gimbal arrangement. In less complex embodiments, a pivot or pin joint may be provided to permit rotation of the joystick 60 relative to the base housing 62 about a single axis.

The joystick 60 of MRF joystick device 52 further includes a stinger or lower joystick extension 120, which projects from the generally spherical base 112 in a direction opposite the joystick handle 110. The lower joystick extension 120 is coupled to a static attachment point of the base housing 62 by a single return spring 124 in the illustrated schematic; here noting that such an arrangement is simplified for the purposes of illustration and more complex spring return arrangements (or other joystick biasing mechanisms, if present) will typically be employed in actual embodiments of the MRF joystick device 52. When the joystick 60 is displaced from the neutral or home position shown in FIG. 3, the return spring 124 deflects as shown in FIG. 4 to urge return of the joystick 60 to the home position (FIG. 3). Consequently, as an example, after rotation into the position shown in FIG. 4, the joystick 60 will return to the neutral or home position shown in FIG. 3 under the influence of the return spring 124 should the work vehicle operator subsequently release the joystick handle 110.

The example MRF joystick resistance mechanism 56 includes a first and second MRF cylinders 126, 128 shown in FIGS. 3 and 4, respectively. The first MRF cylinder 126 (FIG. 3) is mechanically joined between the lower joystick extension 120 and a partially-shown, static attachment point or infrastructure feature 130 of the base housing 62. Similarly, the second MRF cylinder 128 (FIG. 4) is mechanically joined between the lower joystick extension 120 and a static attachment point 132 of the base housing 62, with the MRF cylinder 128 rotated relative to the MRF cylinder 126 by approximately 90 degrees about the Z-axis of the coordinate legend 118. Due to this structural configuration, the MRF cylinder 126 (FIG. 3) is controllable to selectively resist rotation of the joystick 60 about the X-axis of coordinate legend 118, while the MRF cylinder 128 (FIG. 4) is controllable to selectively resist rotation of the joystick 60 about the Y-axis of coordinate legend 118. Additionally, both MRF cylinders 126, 128 can be jointly controlled to selectively resist rotation of the joystick 60 about any axis falling between the X- and Y-axes and extending within the X-Y plane. In other embodiments, a different MRF cylinder configuration may be utilized and include a greater or lesser number of MRF cylinders; e.g., in implementations in which it is desirable to selectively resist rotation of joystick 60 about only the X-axis or only the Y-axis, or in implementations in which joystick 60 is only rotatable about a single axis, a single MRF cylinder or a pair of antagonistic cylinders may be employed. Finally, although not shown in the simplified schematics, any number of additional components can be included in or associated with the MRF cylinders 126, 128 in further implementations. Such additional components may include sensors for monitoring the stroke of the cylinders 126, 128 if desirably known to, for example, track joystick position in lieu of the below-described joystick sensors 182, 184.

The MRF cylinders 126, 128 each include a cylinder body 134 to which a piston 138, 140 is slidably mounted. Each cylinder body 134 contains a cylindrical cavity or bore 136 in which a head 138 of one of the pistons 138, 140 is mounted for translational movement along the longitudinal axis or centerline of the cylinder body 134. About its outer periphery, each piston head 138 is fitted with one or more dynamic seals (e.g., O-rings) to sealingly engaging the interior surfaces of the cylinder body 134, thereby separating the bore 136 into two antagonistic variable-volume hydraulic chambers. The pistons 138, 140 also each include an elongated piston rod 140, which projects from the piston head 138 toward the lower joystick extension 120 of the joystick 60. The piston rod 140 extends through an end cap 142 affixed over the open end of the cylinder body 134 (again, engaging any number of seals) for attachment to the lower joystick extension 120 at a joystick attachment point 144. In the illustrated example, the joystick attachment points 144 assume the form of pin or pivot joints; however, in other embodiments, more complex joints (e.g., spherical joints) may be employed to form this mechanical coupling. Opposite the joystick attachment points 144, the opposing end of the MRF cylinders 126, 128 are mounted to the respective static attachment points 130, 132 via spherical joints 145. Finally, hydraulic ports 146, 148 are further provided in opposing end portions of each MRF cylinder 126, 128 to allow the inflow and outflow of magnetorheological fluid in conjunction with translational movement or stroking of the pistons 138, 140 along the respective longitudinal axes of the MRF cylinders 126, 128.

The MRF cylinders 126, 128 are fluidly interconnected with corresponding MRF valves 150, 152, respectively, via flow line connections 178, 180. As is the case with the MRF cylinders 126, 128, the MRF valves 150, 152 are presented as identical in the illustrated example, but may vary in further implementations. Although referred to as "valves" by common terminology (considering, in particular, that the MRF valves 150, 152 function to control magnetorheological fluid flow), it will be observed that the MRF valves 150, 152 lack valve elements and other moving mechanical parts in the instant example. As a beneficial corollary, the MRF valves 150, 152 provide fail safe operation in that, in the unlikely event of MRF valve failure, magnetorheological fluid flow is still permitted through the MRF valves 150, 152 with relatively little resistance. Consequently, should either or both of the MRF valves 150, 152 fail for any reason, the ability of MRF joystick resistance mechanism 56 to apply resistance forces restricting or inhibiting joystick motion may be compromised; however, the joystick 60 will remain freely rotatable about the X- and Y-axes in a manner similar to a traditional, non-MRF joystick system, and the MRF joystick device 52 will remain capable of controlling the excavator boom assembly 24 as typical.

In the depicted embodiment, the MRF valves 150, 152 each include a valve housing 154, which contains end caps 156 affixed over opposing ends of an elongated cylinder core 158. A generally annular or tubular flow passage 160 extends around the cylinder core 158 and between two fluid ports 162, 164, which are provided through the opposing end caps 156. The annular flow passage 160 is surrounded by (extends through) a number of EM inductor coils 166 (hereafter, "EM coils 166"), which are wound around paramagnetic holders 168 and interspersed with a number of axially- or longitudinally-spaced ferrite rings 170. A tubular shroud 172 surrounds this assembly, while a number of leads are provided through the shroud 172 to facilitate electrical interconnection with the housed EM coils 166. Two such leads, and the corresponding electrical connections to a power supply and control source 177, are schematically represented in FIGS. 3 and 4 by lines 174, 176. As indicated by arrows 179, the controller architecture 50 is operably coupled to the power supply and control source 177 in a manner enabling the controller architecture 50 to control the source 177 to vary the current supplied to or the voltage applied across the EM coils 166 during operation of the MRF joystick system 22. This structural arrangement thus allows the controller architecture 50 to command or control the MRF joystick resistance mechanism 56 to vary the strength of an EM field generated by the EM coils 166. The annular flow passage 160 extends through the EM coils 166 (and may be substantially co-axial therewith) such that the magnetorheological fluid passes through the center the EM field when as the magnetorheological fluid is conducted through the MRF valves 150, 152.

The fluid ports 162, 164 of the MRF valves 150, 152 are fluidly connected to the ports 146, 148 of the corresponding the MRF cylinders 126, 128 by the above-mentioned conduits 178, 180, respectively. The conduits 178, 180 may be, for example, lengths of flexible tubing having sufficient slack to accommodate any movement of the MRF cylinders 126, 128 occurring in conjunction with rotation of the joystick 60. Consider, in this regard, the example scenario of FIG. 4. In this example, an operator has moved the joystick handle 110 in an operator input direction (indicated by arrow 185) such that the joystick 60 rotates about the Y-axis of coordinate legend 118 in a clockwise direction. In combination with this joystick motion, the MRF cylinder 128 rotates about the spherical joint 145 to tilt slightly upward as shown. Also, along with this operator-controlled joystick motion, the piston 138, 140 contained in the MRF cylinder 128 retracts such that the piston head 138 moves to the left in FIG. 4 (toward the attachment point 132). The translation movement of the piston 138, 140 forces magnetorheological fluid flow through the MRF valve 152 to accommodate the volumetric decrease of the chamber on the left of the piston head 138 and the corresponding volumetric increase of the chamber to the right of the piston head 138. Consequently, at any point during such an operator-controlled joystick rotation, the controller architecture 50 can vary the current supplied to or the voltage across the EM coils 166 to vary the force resisting magnetorheological fluid flow through the MRF valve 152 and thereby achieve a desired MRF resistance force resisting further stroking of the piston 138, 140.

Given the responsiveness of MRF joystick resistance mechanism 56, the controller architecture 50 can control the resistance mechanism 56 to only briefly apply such an MRF resistance force, to increase the strength of the MRF resistance force in a predefined manner (e.g., in a gradual or stepped manner) with increasing piston displacement, or to provide various other resistance effects (e.g., a tactile detent or pulsating effect), as discussed in detail below. The controller architecture 50 can likewise control the MRF joystick resistance mechanism 56 to selectively provided such resistance effects as the piston 138, 140 included in the MRF valve 150 strokes in conjunction with rotation of the joystick 60 about the X-axis of coordinate legend 118. Moreover, the MRF joystick resistance mechanism 56 may be capable of independently varying the EM field strength generated by the EM coils 166 within the MRF valves 150, 152 to allow independent control of the MRF resistance forces inhibiting joystick rotation about the X- and Y-axes of coordinate legend 118.

The MRF joystick device 52 may further contain one or more joystick position sensors 182, 184 (e.g., optical or non-optical sensors or transformers) for monitoring the position or movement of the joystick 60 relative to the base housing 62. In the illustrated example, specifically, the MRF joystick device 52 includes a first joystick position sensor 182 (FIG. 3) for monitoring rotation of the joystick 60 about the X-axis of coordinate legend 118, and a second joystick position sensor 184 (FIG. 4) for monitoring rotation of the joystick 60 about the Y-axis of coordinate legend 118. The data connections between the joystick position sensors 182, 184 and the controller architecture 50 are represented by lines 186, 188, respectively. In further implementations, the MRF joystick device 52 can include various other non-illustrated components, as can the MRF joystick resistance mechanism 56. Such components can include operator inputs and corresponding electrical connections provided on the joystick 60 or the base housing 62, AFF motors, and pressure and/or flow rate sensors included in the flow circuit of the MRF joystick resistance mechanism 56, as appropriate, to best suit a particular application or usage.

As previously emphasized, the above-described embodiment of the MRF joystick device 52 is provided by way of non-limiting example only. In alternative implementations, the construction of the joystick 60 can differ in various respects. So too may the MRF joystick resistance mechanism 56 differ in further embodiments relative to the example shown in FIGS. 3 and 4, providing that the MRF joystick resistance mechanism 56 is controllable by the controller architecture 50 to selectively apply a resistance force (through changes in the rheology of a magnetorheological fluid) inhibiting movement of a joystick relative to a base housing in at least one DOF. In further realizations, EM inductor coils similar or identical to the EM coils 166 may be directly integrated into the MRF cylinders 126, 128 to provide the desired controllable MRF resistance effect. In such realizations, magnetorheological fluid flow between the variable volume chambers within a given MRF cylinder 126, 128 may be permitted via the provision of one or more orifices through the piston head 138, by providing an annulus or slight annular gap around the piston head 138 and the interior surfaces of the cylinder body 134, or by providing flow passages through the cylinder body 134 or sleeve itself. Advantageously, such a configuration may impart the MRF joystick resistance mechanism with a relatively compact, integrated design. Comparatively, the usage of one or more external MRF valves, such as the MRF valves 150, 152 (FIGS. 3 and 4), may facilitate cost-effective manufacture and allow the usage of commercially-available modular components in at least some instances.

In still other implementations, the design of the MRF joystick device may permit the magnetorheological fluid to envelop and act directly upon a lower portion of the joystick 60 itself, such as the spherical base 112 in the case of the joystick 60, with EM coils positioned around the lower portion of the joystick and surrounding the magnetological fluid body. In such embodiments, the spherical base 112 may be provided with ribs, grooves, or similar topological features to promote displacement of the magnetorheological fluid in conjunction with joystick rotation, with energization of the EM coils increasing the viscosity of the magnetorheological fluid to impede fluid flow through restricted flow passages provided about the spherical base 112 or, perhaps, due to sheering of the magnetorheological fluid in conjunction with joystick rotation. Various other designs are also possible in further embodiments of the MRF joystick system 22.

Regardless of the particular design of the MRF joystick resistance mechanism 56, the usage of MRF technology to selectively generate a variable MRF resistance force inhibiting (resisting or preventing) problematic joystick motions provides several advantages. As a primary advantage, the MRF joystick resistance mechanism 56 (and MRF joystick resistance mechanism generally) are highly responsive and can effectuate desired changes in EM field strength, in the rheology of the magnetorheological fluid, and ultimately in the MRF resistance force inhibiting joystick motions in highly abbreviated time periods; e.g., time periods on the order of 1 ms in certain instances. Correspondingly, the MRF joystick resistance mechanism 56 may enable the MRF resistance force to be removed (or at least greatly reduced) with an equal rapidity by quickly reducing current flow through the EM coils and allowing the rheology of the magnetorheological fluid (e.g., fluid viscosity) to revert to its normal, unstimulated state. The controller architecture 50 can further control the MRF joystick resistance mechanism 56 to generate the MRF resistance force to have a continuous range of strengths or intensities, within limits, through corresponding changes in the strength of the EM field generated utilizing the EM coils 166. Beneficially, the MRF joystick resistance mechanism 56 can provide reliable, essentially noiseless operation over extended time periods. Additionally, the magnetorheological fluid can be formulated to be non-toxic in nature, such as when the magnetorheological fluid contains carbonyl iron-based particles dispersed in an alcohol-based or oil-based carrier fluid, as previously described. Finally, as a still further advantage, the above-described configuration of the MRF joystick resistance mechanism 56 allows the MRF joystick system 22 to selectively generate a first resistance force deterring joystick rotation about a first axis (e.g., the X-axis of coordinate legend 118 in FIGS. 3 and 4), while further selectively generating a second resistance force deterring joystick rotation about a second axis (e.g., the Y-axis of coordinate legend 118) independently of the first resistance force; that is, such that the first and second resistance forces have different magnitudes, if desired.

Figure 5:
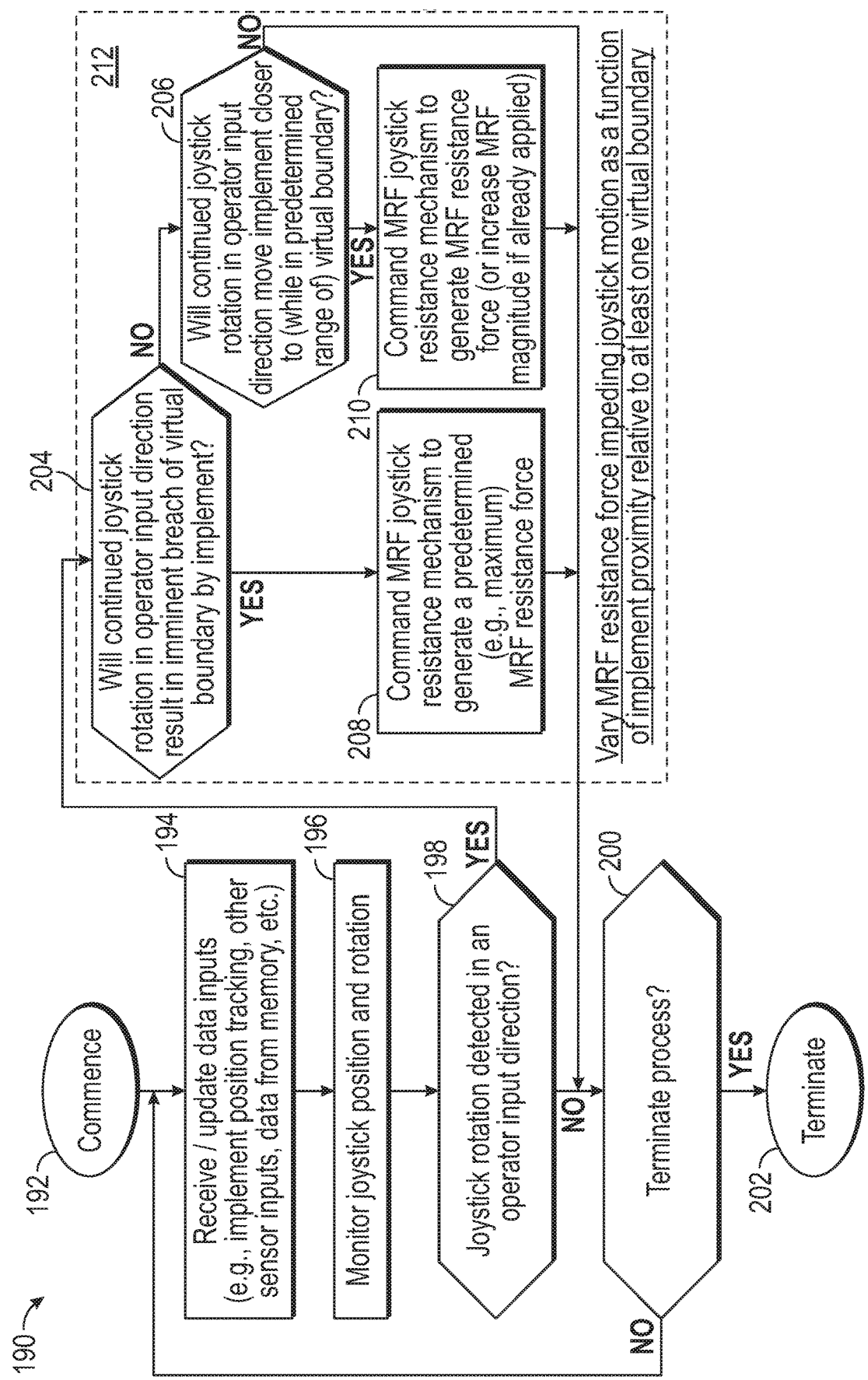
FIG. 5 is a flowchart of an example process suitably carried-out by the controller architecture of the MRF joystick system to vary MRF resistance forces selectively inhibiting joystick movement as a function of implement movement relative to one or more virtual boundaries.

Referring now to FIG. 5, there is shown an example process 190 suitably carried-out by the controller architecture 50 of the MRF joystick system 22 to selectively vary the MRF resistance force impeding joystick motion as a function of implement movement relative to one or more virtual boundaries. The process 190 (hereafter, the "implement command guidance process 190") includes a number of process STEPS 192, 194, 196, 198, 200, 202, 204, 206, 208, 210, each of which is described, in turn, below. STEPS 204, 206, 208, 210 are further grouped as a graded MRF force generation subprocess 212. Depending upon the particular manner in which the implement command guidance process 190 is implemented, each step generically illustrated in FIG. 5 may entail a single process or multiple sub-processes. Further, the steps illustrated in FIG. 5 and described below are provided by way of non-limiting example only. In alternative embodiments of the implement command guidance process 190, additional process steps may be performed, certain steps may be omitted, and/or the illustrated process steps may be performed in alternative sequences.

The implement command guidance process 190 commences at STEP 192 in response to the occurrence of a predetermined trigger event. The trigger event can be, for example, startup of a work vehicle (e.g., the excavator 20 shown in FIGS. 1 and 2) or, instead, entry of operator input requesting activation of the implement command guidance process 190; e.g., in one embodiment, an operator may interact with a GUI generated on the display device 82 to initiate the implement command guidance process 190. In other instances, the controller architecture 50 may commence the implement command guidance process 190 automatically (that is, without requiring operator input) when determining that the work vehicle is engaged in a particular type of work task, such as an excavation or grading task. For example, in the case of an excavator (e.g., the excavator 20 shown in FIGS. 1 and 2), a backhoe, a dozer, a motor grader, or a similar work vehicle, the controller architecture 50 may automatically commence the implement command guidance process 190 when a bucket, an earth-moving blade, or an similar excavation tool attached to the work vehicle is lowered into a ground-penetrating position, when the stabilizer arms of the work vehicle are lowered (in the case of a backhoe), or when the operator provides input indicative of an impending excavation operation. As a further possibility, the controller architecture 50 may commence the implement command guidance process 190 in response to the detection of a different predetermined condition or event. As a further example, in implementations in which virtual boundaries are established around or adjacent detected obstacles, the controller architecture 50 may commence the implement command guidance process 190 when sensors onboard the work vehicle (e.g., included in the non-joystick sensors 76 shown in FIG. 1) detect a nearby obstacle in proximity of the work vehicle.

After initiating the implement command guidance process 190, the controller architecture 50 progresses to STEP 194 and gathers the pertinent non-joystick data inputs utilized in performing the remainder of the process 190. Such data inputs will typically include reception of current implement tracking data utilized to monitor the position of a joystick-controlled implement or tool relative to the body or chassis of a work vehicle. Accordingly, in the case the excavator 20, data from the boom assembly tracking sensors 72 may be received at the controller architecture 50 during STEP 194 of the implement command guidance process 190. The controller architecture 50 then utilizes this data to estimate the position of the bucket 26 (or other implement) joined to the outer terminal end of the boom assembly 24 in a 3D spatial volume or "tool space" adjacent the excavator chassis 28. As described above, such implement tracking data can include data captured by accelerometers, gyroscopes, magnetometers, or other such MEMS devices (e.g., packages as IMUs), from inclinometers, or from similar sensors distributed across the boom assembly 24. Additionally or alternatively, angular displacements about the pivot joints of the boom assembly 24 and/or linear displacements of the hydraulic cylinders 38, 40, 42 may be considered in conjunction with known kinematics (pertinent component dimensions) to estimate the positional movement of the bucket 26 in the 3D tool space. As a further possibility, image analysis from one or more video feeds captured by a vision system can also be utilized to implement movement in embodiments. Generally, then, any type of data may be gathered suitable for tracking the positioning and, perhaps, the orientation of a movable implement in a 3D space may be gathered by the controller architecture 50 during STEP 194 of the implement command guidance process 190.

Other data may also be gathered during STEP 194 and considered by the controller architecture 50 in establishing the location, orientation, and/or geometry of one or more virtual boundaries within the 3D tool space, as further considered during the graded MRF force generation subprocess 212 (described below). This may include data provided by onboard sensors (e.g., the non-joystick sensors 70 of the excavator 20 shown in FIG. 1) pertaining to local ground height, ground slope, and/or other terrain characteristics, as may be determined utilizing distance measuring equipment or other sensors integrated into the work vehicle. Such data may be useful when, for example, the position of at least one virtual boundary (e.g., the below-described excavation floor) is established utilizing the local ground height as a reference point. Operator input data related to the virtual boundaries may also be entered via the operator interface 80 and further considered by the controller architecture 50 during STEP 194 when carrying-out the process 190. Such operator input may specify, for example, a desired position and/or orientation of one or more virtual boundaries, such as the below-ground depth (and possibly slope) of a virtual excavation floor, the above-ground height of a virtual ceiling, or other data indicating a desired positioning (and possibly orientation) or one or more virtual boundaries.

In embodiments in which the work vehicle is equipped with a grade control system, such as the grade control system 74 of the example excavator 20 (FIG. 1), data from the grade control system may be provided to the controller architecture 50; e.g., via placement on the vehicle bus 84. The controller architecture 50 may then utilize such data (herein, "grade target data") to establish a position and orientation of a virtual excavation floor (and geometry when the virtual excavation floor is three dimensional or non-planar) utilizing the data provided by the grade control system 74. Accordingly, in such implementations, the work vehicle at issue (e.g., a dozer or motor grader) may move relative to the virtual excavation floor, while an operator utilizes the pertinent joystick device or devices to repeatedly position of the work vehicle implement (e.g., an earth-moving blade) to displace the underlying earth (or other material) in a controlled manner creating the desired surface topology generally conforming to the virtual excavation floor. As a still further possibility, data indicative of the location of any nearby obstacles may be gathered during STEP 194 when such data is utilized in generating the below-described virtual boundaries as, for example, keep-out zones or virtual barriers discouraging inadvertent contact between an implement and nearby obstacles. Again, such obstacle detection data may be provided by suitable sensor arrays (e.g., as included in the additional sensors 76 shown in FIG. 1) measuring energy signals (e.g., laser, acoustic, or radar pulses) reflected from obstacles in proximity of the work vehicle.

Progressing to STEP 198 of the implement command guidance process 190, the controller architecture 50 receives data indicative of the current joystick movement and position of the MRF joystick device or devices under consideration. In the case of the example excavator 20, the controller architecture 50 receives data from the joystick position sensors 182, 184, which describes the movement of the respective joysticks 60 included in the devices 52, 54. The controller architecture 50 utilizes this data to determine whether an operationally-significant movement of one or more joystick has occurred during the current iteration of the implement command guidance process 190. If such joystick movement is detected, the controller architecture 50 progresses to the graded MRF force generation subprocess 212, as described below. Otherwise, the controller architecture 50 advances to STEP 200 and determines whether the current iteration of the implement command guidance process 190 should terminate; e.g., due to work vehicle shutdown, due to continued inactivity of the joystick-controlled function for a predetermined time period, or due to removal of the condition or trigger event in response to which the process 190 was initially commenced at STEP 192. If determining that the implement command guidance process 190 should terminate at STEP 200, the controller architecture 50 progresses to STEP 202, the process 190 terminates accordingly. If instead determining that the implement command guidance process 190 should continue, the controller architecture 50 returns to STEP 194 and the above-described process steps repeat.

In response to the detection of operationally-significant joystick rotation (or other joystick movement) at STEP 202, the controller architecture 50 advances to the graded MRF force generation subprocess 212 of the implement command guidance process 190. As indicated in FIG. 5, the controller architecture 50 can command the MRF joystick resistance mechanism 56 to generate a range of resistance or stiffness responses during the subprocess block 212 based upon, for example, the proximity of an implement (e.g., the bucket 26 of the excavator 20) to one or more virtual boundaries established by the controller architecture 50 in a real-world, 3D volume of space. In this regard, and as discussed more fully below, the graded MRF force generation subprocess 212 may be carried-out to provide a range of MRF resistance force responses to implement movement relative to one or more virtual boundaries, which may define or boarder an operational envelope within which a joystick-controlled implement is desirably confined. In other, less complex implementations, the controller architecture 50 may control the MRF resistance mechanism 56 to provide a single tactile feedback effect indicative of, for example, implement motion relative to one or more virtual boundaries. For example, in one simplified approach, the controller architecture 50 may command the MRF resistance mechanism to generate a feel detent, a brief pulsating resistance effect, or a similar effect when detecting implement breach of a virtual boundary. Similarly, in other embodiments, the controller architecture 50 may control the MRF joystick resistance mechanism 56 to otherwise provide a single MRF-applied effect, rather than a graded or progressively varied MRF resistance response of the type described below, to discourage virtual boundary breach; e.g., the controller architecture 50 may command the MRF joystick resistance mechanism 56 to generate a maximum MRF resistance force preventing or impeding further joystick-controlled implement movement corresponding to the current operator input direction when an implement breaches or immediately before an implement breaches a virtual boundary.

In carrying-out the graded MRF force generation subprocess 212, the controller architecture 50 may determine the positioning of the virtual boundaries in any suitable manner. In certain cases, and as also discussed above, the controller architecture 50 may establish the positioning of a virtual boundary utilizing operator input data received via the operator interface 80. Such operator input may, for example, specify a vertical (e.g., below-ground) depth of an excavation floor above which a joystick-controlled implement is desirably maintained during a work task. The controller architecture 50 may measure such a below-ground depth along a vertical axis (parallel to gravity) from any suitable spatial reference point, such as a local ground height. Similarly, the operator input may specify a vertical (e.g., above-ground) height of a virtual ceiling below the implement is desirably maintained. In certain instances, the MRF joystick system 22 may further permit an operator to adjust the slope or orientation of such virtual boundaries via interactions with the operator interface 80; e.g., by interacting with a GUI generated on the display device 82 to set the grade or slope of a virtual excavation floor, as described below in connection with FIG. 6. In still other instances, the positioning of such a virtual boundary or excavation floor may be determined utilizing data provided by a grade control system, such as the grade control system 74 onboard the example excavator 20 shown in FIG. 1, with the virtual excavation floor having a 2D (planar) or 3D (non-planar) geometry generally conforming with the target grade data provided by the grade control system.

In further implementations, and as also discussed above, the positioning of one or more virtual boundaries may be determined utilizing data provided by an obstacle detection system onboard the work vehicle under consideration. For example, in the case of the example excavator 20, the controller architecture 50 may utilize data received from (e.g., obstacle detection) sensors 76 to establish one or more virtual boundaries, which are spatially positioned to decrease the likelihood of inadvertent contact between a joystick-controlled implement and a detected obstacle, such as the sidewall of a structure, another work vehicle, or another physical object in proximity of the work vehicle. This may be useful when, for example, the excavator 20 or another work vehicle is utilized to dig a trench or other excavation feature adjacent such a neighboring obstacle. In other instances, the controller architecture 50 may recall obstacle location or map data from the memory 48 in establishing the spatial location of the virtual boundary or boundaries utilizing in performing the subprocess 212. The controller architecture 50 may then utilize such stored map data to establish virtual boundaries between the implement and any mapped obstacles (e.g., buried pipes, buried electrical conduits, powerlines, or the like) to help maintain a desired spatial offset for keep-out zone between the implement and the obstacles, or to otherwise reduce the likelihood of inadvertent contact with such obstacles when conducting a work task, such as digging a trench or other excavation feature utilizing the example excavator 20 shown in FIG. 1.

At STEP 204 of the graded MRF force generation subprocess 212, the controller architecture 50 determines whether continued joystick rotation in an operator input direction will result in imminent breach of a virtual boundary by a joystick-controlled implement. In embodiments, the controller architecture 50 may determine whether any portion of the implement (and, perhaps, the boom assembly 24 in the case of the example excavator 20) will breach the virtual boundary during STEP 204. In other implementations, the controller architecture 50 may consider only whether a specific of the joystick-controlled implement, such as the cutting edge of the implement, is presently breaching or is at risk of imminently breaching the virtual boundary under consideration. In rendering this determination, the controller architecture 50 may track movement of the implement in a 3D volume of space relative to one or more virtual boundaries utilizing any suitable processing or spatial modeling technique, several examples of which have been outlined above. If determining that continued joystick rotation (or other motion) in the operator input direction will result in imminent breach of a virtual boundary by the joystick-controlled implement during STEP 204 of the subprocess 212, the controller architecture 50 commands the MRF resistance mechanism 56 to generate an MRF resistance force inhibiting continued joystick rotation in the operator input direction. In implementations, the controller architecture 50 may command the MRF joystick resistance mechanism 56 to generate a maximum MRF resistance force in an attempt to arrest further joystick rotation in the operator input direction; or, at minimum, render continued rotation of the joystick in the operator input direction relatively difficult. Implement breach of the virtual boundary may be avoided as a result, whether due to physical prevention of joystick motion in the problematic direction or due to the conveyance of a highly noticeable tactile signal to the operator to cease continued joystick rotation in the problematic direction. After applying the desired MRF resistance effect (STEP 200), the controller architecture 50 then advances to STEP 200 determines whether the implement command guidance process 190 should continue or terminate.

If instead determining during STEP 204 that continued joystick rotation in the operator input direction will not result in imminent virtual boundary breach by the joystick-controlled implement, the controller architecture 50 progresses to STEP 206 of the graded MRF force generation subprocess 212. During STEP 206, the controller architecture 50 evaluates whether continued joystick rotation in the operator input direction will bring the implement into a predetermined proximity of a virtual boundary. If determining this not to be the case, the controller architecture 50 advances to STEP 200 and again considers whether the current iteration of the process 190 should terminate. Otherwise, the controller architecture 50 progresses to STEP 210 and commands the MRF joystick resistance mechanism 56 to generate increase the MRF resistive force impeding joystick motion in the operator input direction. In so doing, the MRF joystick system 22 generates an intuitive tactile cue, as communicated to the operator through the pertinent joystick device(s), indicating that the joystick-controlled implement is nearing a virtual boundary. The controller architecture 50 may command the MRF joystick resistance mechanism 56 to initially generate an MRF resistance force deterring further rotation of the joystick in the operator input direction if such an MRF resistance force has not yet been applied. If, instead, such an MRF resistance force has been previously applied, the controller architecture 50 may command the MRF joystick resistance mechanism 56 to increase the magnitude of the MRF resistance force. In this latter case, the MRF resistance force can be increased in a gradual (stepwise or continuous) manner to the extent that joystick rotation in the operator input direction continues and the joystick-controlled implement moves increasingly toward the virtual boundary under consideration. Across multiple iterations of the STEP 210, the controller architecture 50 may command the MRF joystick resistance mechanism 56 to vary the MRF resistance force such that, as an implement nears or approaches the virtual boundary, the MRF resistance force increases substantially proportionally to a separation distance between the implement and the virtual boundary. Following STEP 210, the controller architecture 50 progresses to STEP 200 and once again determines whether the current iteration of the process 190 should cease or continue.

In repeatedly performing the implement command guidance process 190 in the manner just described, the controller architecture 50 of the MRF joystick system 22 selectively commands the MRF joystick resistance mechanism 56 to vary an MRF resistance force resisting joystick motion based, at least in part, on implement movement relative to one or more virtual boundary or boundaries. In so doing, the MRF joystick system 22 provides implement command guidance as, for example, intuitive tactile cues to the work vehicle operator to slow, if not halt movement of the joystick in an operator input direction when appropriate to prevent virtual boundary breach. Further, in instances in which the controller architecture commands the MRF joystick resistance mechanism to generate a maximum MRF resistance force, the MRF resistance force may be sufficient to render joystick motion in the operator input direction highly difficult or, perhaps, physically arrest continued joystick movement in the problematic direction. In this manner, the MRF joystick system 22 may assist an operator in controlling implement via one or more joystick devices to, for example, impart a desired grade or topology to terrain, to dig an excavation feature to desired dimensions (e.g., a desired depth or slope), to decrease the likelihood of undesired impact between the implement and nearby obstacles, and/or to provide various other functions useful in guiding a joystick-controlled implement mounted to a work vehicle. For completeness, an example use case scenario in which the implement command guidance process 190 may be beneficially performed during operation of the example excavator 20 is further described below in connection with FIG. 6.

Figure 6:
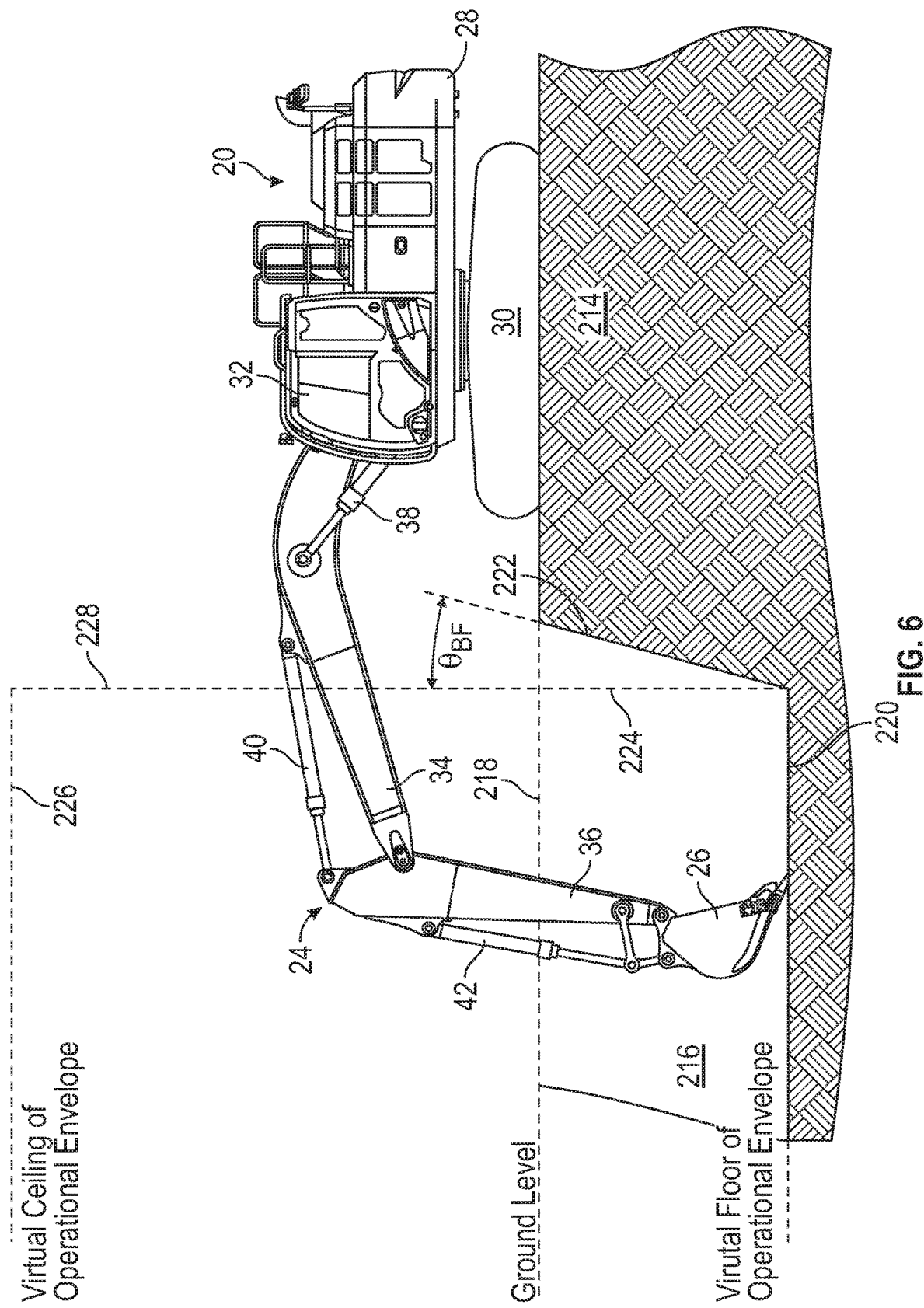
FIG. 6 is a schematic of one manner in which the excavator shown in FIG. 1 may be utilized to dig an excavation feature, while the controller architecture of the MRF joystick system executes the process set-out in FIG. 5 in an example use case.

FIG. 6 sets-forth an example scenario in which the above-described excavator 20 when utilized to perform a digging or excavation task to create an excavation feature 216 within the ground 214 of a work area. In this example, a lower virtual boundary or excavation floor has been established by the controller architecture 50 of the MRF joystick system 22 in a 3D tool space, as represented by a horizontal line 220. The MRF joystick system 22 may be operable in a dig depth limiting mode to prevent (or at least deter) the operator from controlling boom assembly-attached implement (here, the bucket 26 attached to the excavator boom assembly 24) to dig the excavation feature 216 to an excessive depth. The location, and possibly orientation, of the excavation floor 220 may be established from data recalled from the memory 48 and referenced to the current location of the excavator 20 as determined from, for example, a GPS module onboard the excavator 20. Alternatively, the location of the excavation floor 220 may be established by operator input data entered into the MRF joystick system 22 via the operator interface 80 (FIG. 1). For example, in embodiments, the operator may enter a below-ground level or "excavation depth setting" at which the virtual excavation floor 220 is desirably located. As indicated above, such a below-ground depth; e.g., depth measured from a local ground height reference point 218 in a downward direction along a vertical axis 224, which is substantially parallel to the direction of gravity. To establish this reference point, the controller architecture 50 may measure the local ground height utilizing appropriate sensors (e.g., laser-based sensors or distance measuring equipment included in the sensors 76); determine the local ground height utilizing a calibration process in which an operator controls the boom assembly 24 to rest the bucket 26 on the ground, with the controller architecture 50 then calculating the local ground height utilizing data from the boom assembly tracking sensors 72 and known kinematics of the boom assembly 24; or estimate the local ground height as a default setting relative to the work vehicle chassis.

In addition to or in lieu of establishing the virtual excavation floor 220, the controller architecture 50 of the MRF joystick system 22 may establish any number of additional virtual boundaries referenced during the ensuing excavation task. For example, in embodiments, the controller architecture 50 may further establish an upper boundary or virtual ceiling 226 below which the implement 26 (and, perhaps, all portions of boom assembly 24) is desirably maintained. The controller architecture 50 may establish the location of the virtual ceiling in any suitable manner, including based upon operator input or data provided by an obstacle detection system onboard the excavator 20. In one approach, for example, the MRF joystick system 22 may receive operator input specifying a desired above-ground height of the virtual ceiling 226, as measured along a vertical axis 228 extending parallel to the direction of gravity. The above-described process for varying the MRF joystick stiffness or resistive force based upon implement proximity to the virtual ceiling 226 may then be carried-out in a manner analogous to that described above. The provision of a virtual ceiling 226 may be useful in embodiments in which the excavator 20 (or another work vehicle) operates in an enclosed environment, such as a barn or a mine, or when the excavator 20 operates in an outdoor location in which overhead obstacles (e.g., tree branches or overhanging structural features) are present.

In various implementations, the controller architecture 50 of the MRF joystick system 22 utilizes data provided by boom assembly tracking sensors 72 to track the position of the excavation tool (here, the excavator bucket 26) relative to the virtual excavation floor 220 and the virtual ceiling 226, when either or both of these virtual boundaries or thresholds are generated. As previously discussed above in connection with STEP 194 of the process 190, the boom assembly tracking sensors 74 can include any type and number of sensors for monitoring the movement of the excavation tool relative to the chassis of the excavator 20 other fixed reference point. For example, in one approach, rotary position sensors are integrated into the pivot joints of the boom assembly 24; and the angular displacement readings captured by the rotary position sensors, taken in conjunction with known dimensions of the boom assembly 24, are utilized to track the position of the excavation tool (the bucket 26) and, perhaps, specifically track the position of a cutting edge of the bucket 26 in the 3D tool space. Other sensor inputs can also be considered in addition or lieu of such rotational position readings, such as linear displacements of hydraulic cylinders 38, 40, 42 integrated into the boom assembly 24, inertia-based sensor readings (as captured by MEMS devices, such as MEMS accelerometers or gyroscopes, incorporated into the boom assembly 24), measurements captured by sensors indicative of a current orientation of the excavator chassis 28.

Regardless of the particular manner in which the bucket 26 is tracked, the controller architecture 50 repeatedly predicts when an operator-commanded movement of the excavator boom assembly 24 will result in breach of the virtual excavation floor 220 (or the virtual ceiling 226) by the bucket 26. When determining that an operator-commanded movement of the excavator boom assembly 24 will result in breach of the virtual excavation floor 220, the controller architecture 50 commands the MRF joystick resistance mechanism 56 to generate an MRF resistance force deterring (or perhaps attempting to arrest) continued joystick movement in the operator input direction. This provides an intuitive tactile cue to the work vehicle operator to slow, if not halt movement of the joystick in the operator input direction. Further, in instances in which the controller architecture 50 commands the MRF joystick resistance mechanism 56 to generate a maximum MRF resistance force, the MRF resistance force may be sufficient to fully arrest joystick motion in the operator input direction (or at least render such joystick motion relatively difficult). Additionally or alternatively, the controller architecture 50 may also command the MRF joystick resistance mechanism 56 to gradually increase progressively increase the MRF resistance force with increasing proximity of the bucket 26 to the virtual excavation floor 220, providing the bucket 26 is within a predetermined distance of the floor 220. Similar processes may likewise be applied with respect to the movement of the bucket 26 relative to the virtual ceiling 226 to help maintain the bucket 26 (and possibly other portions of the boom assembly 24) below the virtual ceiling 226.

In other embodiments, the MRF joystick system 22 may enable an operator to establish other virtual (e.g., 2D planar or 3D non-planar) boundaries of an excavation feature in addition to or in lieu of the above-described virtual excavation floor 220. For example, in certain instances, the controller architecture 50 may prevent breach of a virtual sidewall of the excavation feature, such as a backface of a trench, during a given excavation operation. This possibility is further indicated in FIG. 6 in which the illustrated excavation feature or trench is imparted with a backface 222, which forms a desired angle ($\theta_{BE}$) relative to a vertical line 224 extending parallel to the direction of gravity. During operation of the excavator 20, the MRF joystick system may selectively increase the MRF resistance applied to the joysticks 60 (FIGS. 1 and 2) utilized to control the boom assembly movements prevent or at least deter penetration of the backface 222 as an operator pilots the excavator to dig the excavation feature 216. Tactile cues may therefore be generated and communicated through the appropriate joystick device(s) to assist an operator in forming a surface of the excavation feature 216 to have a desired angle. This may be particularly useful in the case of the trench the backface 222 given the inability of the operator to directly view the backface 222 from the cabin 32 of the excavator 20. Similarly, a desired grade, or perhaps a non-planar 3D geometry, can be defined via the virtual dig floor 220 in embodiments, with the MRF joystick system then applying variations in the MRF resistance force to assist an operator with controlling the boom assembly 24 to dig the excavation feature 216 to conform to the desired dig floor. Analogous approaches may be utilized to provide tactile cues aiding operators in creating desired gradients in the case of other work vehicles (e.g., dozers or motor graders) equipped with integrated grade control (IGC) systems, as further discussed below in connection with FIG. 7.

Additional Examples of Work Vehicles Beneficially Equipped with MRF JOYSTICK SYSTEMS The foregoing has thus described examples of MRF joystick systems providing implement command guidance through strategic variations in an MRF resistance force impeding joystick motion in one or more DOFs. While the foregoing description principally focuses on a particular type of work vehicle (an excavator) including a particular type of joystick-controlled implement, embodiments of the MRF joystick system described herein are amenable to integration into a wide range of work vehicles containing joystick devices utilized to control movement of an implement, such as a bucket (or other implement) attached to the terminal end of a hinged boom assembly, a bucket attached to the terminal end of an FEL assembly, or an earth-moving blade movably jointed to the chassis of a motor grader, a dozer, or another work vehicle, to list but a few examples. Three additional examples of such work vehicles are set-forth in FIG. 7 and include a tracked dozer 230, a motor grader 232, and a backhoe loader 234.

Addressing first the tracked dozer 230, the tracked dozer 230 may be equipped with an example MRF joystick device 236, which is located within the cabin 238 of the dozer 230. Operator movement of a joystick 240 included in the MRF joystick device 236 may position an earth-moving blade 242 of the dozer 230, which is pivotally jointed to the dozer chassis 244 and the tracked undercarriage 246 via a push frame 248 and a number of hydraulic cylinders 250, 252. Specifically, during operation of the tracked dozer 230, rotation of the joystick 240 relative to the base housing of the MRF joystick device 236 may position the blade 242 via extension and retraction of the pitch cylinders 250 and the lift cylinders 252. Analogs of the various components described above in connection with FIG. 1 can be integrated into the tracked dozer 230 to provide MRF-applied guidance to the joystick inputs utilized to control movement and positioning of the earth-moving blade 242 (more generally, an "excavation implement" or "tool") in the above-described manner. For example, in one implementation in which the tracked dozer 230 is equipped with a grade control system, the MRF joystick system in which the MRF joystick device 236 is included may vary joystick stiffness to assist an operator in positioning the blade 242 to achieve a desired grade as the tracked dozer 230 moves within a work area.

Turning next to the example motor grader 232, two MRF joystick devices 254 are located within a cabin 256 of the motor grader 232. Rotation of the joysticks 258 included in the MRF joystick devices 254 positions a blade 260 suspended beneath a circle 262, which is mounted below the front frame 264 of the motor grader 232. Jointly, the blade 260 and the circle 262 form a blade-circle assembly 260, 262. In this case, rotation of the joysticks 258 relative to their respective base housings may control blade position 260 via rotation of a circle rotate motor 266, along with stroking (extension and retraction) of hydraulic cylinders 268. During operation of the motor grader 232, an MRF joystick system selectively varies MRF resistance forces resisting rotation of the joysticks 258 to guide implement movement and, specifically, to guide joystick movements controlling rotation of the blade-circle assembly 260, 262, angular adjustments to the blade-circle assembly 260, 262, as well as adjustments to the side shift angle of the blade 260. In a manner similar to the tracked dozer 230, the motor grader 232 may be equipped with an IGC system (or a retrofit grade control system), which provides the controller architecture for the MRF joystick system with data indicative of a desired grade as the motor grader 232 travels over a work area. The MRF joystick system then utilizes the target grade data provided by the grade control system to establish a virtual boundary corresponding to the desired grade and varies an MRF resistance force applied to the joysticks 258 based, at least in part, on implement movement relative to the virtual boundary. In this manner, an operator is provided with intuitive tactile feedback when positioning the blade 260 as appropriate to achieve the desired target grade.

Figure 7:
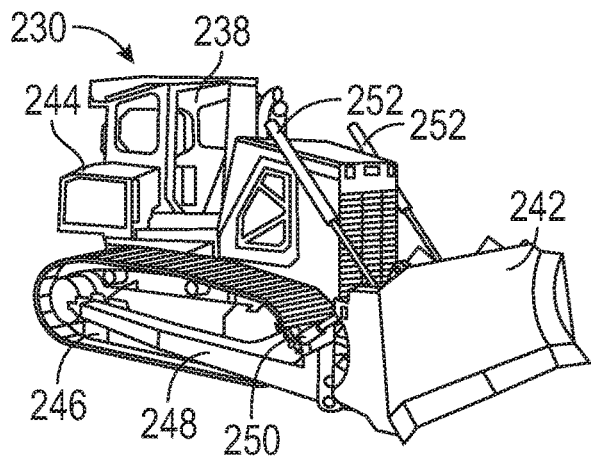
FIG. 7 is a graphic illustrating, in a non-exhaustive manner, additional example work vehicles into which embodiments of the MRF joystick system may be beneficially integrated.
Figure 7:
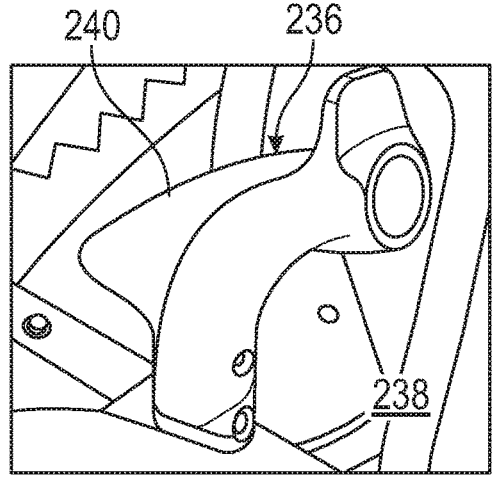
Figure 7:
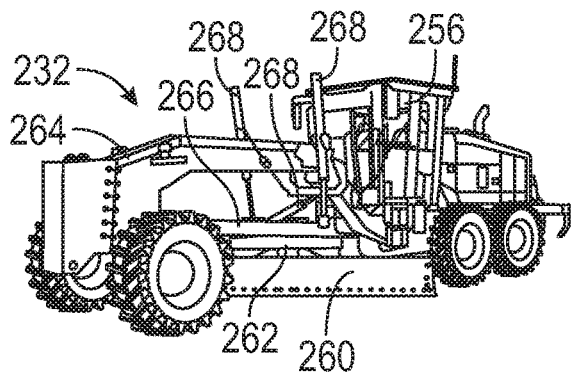
Figure 7:
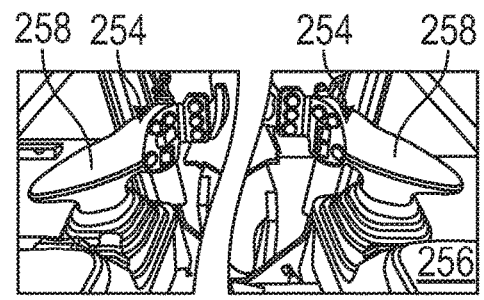
Figure 7:
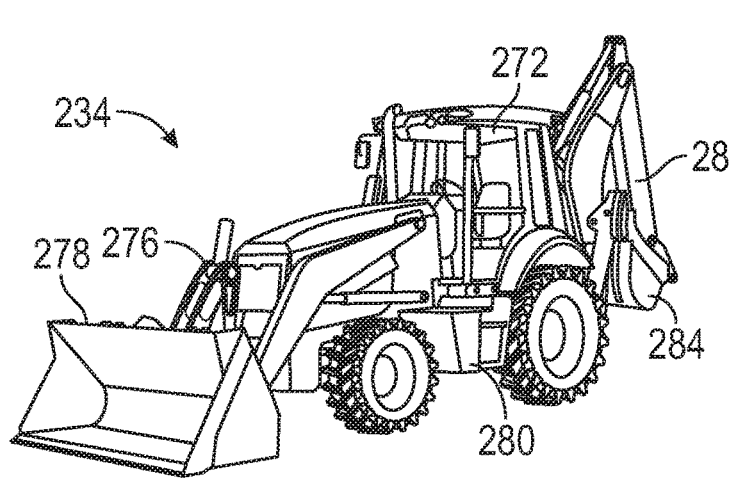
Figure 7:
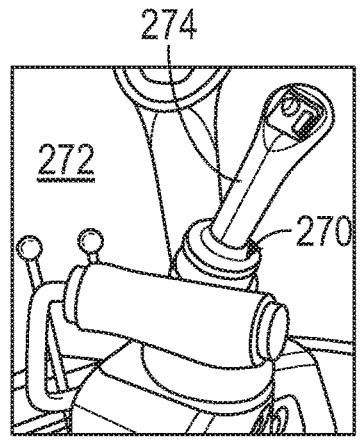

Referring lastly to the backhoe loader 234 depicted in a bottommost portion of FIG. 7, one or more MRF joystick devices 270 may be located in the cabin 272 of the backhoe loader 234. In this example, rotation of the joystick or joysticks 274 included MRF joystick device or devices 270 may be utilized to control the movement of an FEL assembly 276, which terminates in an FEL bucket 278 and is joined to a forward end of the loader chassis 280; to control movement of a backhoe assembly 282, which terminates in an FEL bucket 284 and is joined to a rear end of the loader chassis 280; or both. The MRF joystick device(s) 270 may be controlled by an MRF joystick system as described above to assist an operator in controlling the FEL assembly 276, the backhoe assembly 282, or both to dig an excavation feature to desired dimensions (e.g., a desired depth), to avoid inadvertent contact with nearby obstacles, or to perform other functions. Specifically, in the case of the backhoe assembly 282, the MRF joystick system onboard the backhoe loader 234 may vary the MRF resistance force of the MRF joystick device 270 to guide implement movement in a manner analogous to that discussed above in connection with the example excavator shown in FIGS. 1 and 2. Comparatively, in the case of the FEL assembly 276, the MRF joystick system may further the MRF resistance force of the MRF joystick device 270 to, for example, prevent (or at least discourage) operator joystick commands bringing the FEL bucket 278 into a raised position above a virtual ceiling when the backhoe loader 234 is operated inside a barn or another enclosed structure.

Enumerated Examples of the Work Vehicle Mrf Joystick System

The following examples of the work vehicle MRF joystick system are further provided and numbered for ease of reference.

1. In embodiments, a work MRF joystick system includes a joystick device, an implement tracking data source, an MRF joystick resistance mechanism, and a controller architecture. The joystick device includes, in turn, a base housing, a joystick mounted to the base housing and movable with respect thereto, and a joystick position sensor configured to monitor joystick movement relative to the base housing. The implement tracking data source is configured to track movement of the implement during operation of the work vehicle, while the MRF joystick resistance mechanism is controllable to vary an MRF resistance force impeding joystick movement relative to the base housing. Coupled to the MRF joystick resistance mechanism, to the joystick position sensor, and to the implement tracking data source, the controller architecture is configured to: (i) track movement of the implement relative to a virtual boundary utilizing data provided by the implement tracking data source; and (ii) command the MRF joystick resistance mechanism to vary the MRF resistance force based, at least in part, on implement movement relative to the virtual boundary.

2. The work vehicle MRF joystick system of example 1, wherein the work vehicle is equipped with a grade control system. The controller architecture is coupled to the grade control subsystem and is configured to define the virtual boundary utilizing grade target data provided by the grade control system.

3. The work vehicle MRF joystick system of example 2, wherein the work vehicle includes a dozer or a motor grader, the implement assumes the form of a blade, and the virtual boundary defines a virtual excavation floor.

4. The work vehicle MRF joystick system of example 1, wherein the virtual boundary assumes the form of a virtual excavation floor. Further, the controller architecture is further configured to establish a location and an orientation of the virtual excavation floor in a 3D tool space through which the implement moves.

5. The work vehicle MRF joystick system of example 4, wherein the controller architecture establishes the location of the virtual excavation floor based, at least in part, on an excavation depth setting and a ground height reference point.

6. The work vehicle MRF joystick system of example 4, wherein the controller architecture establishes the orientation of the virtual excavation floor based, at least in part, on operator input indicating a target grade for an excavation feature desirably created utilizing the implement.

7. The work vehicle MRF joystick system of example 1, wherein the controller architecture is configured to progressively increase the MRF resistance force with increasing proximity of the implement to the virtual boundary.

8. The work vehicle MRF joystick system of example 1, wherein the controller architecture is configured to: (i) detect joystick movement in an operator input direction; (ii) when joystick movement in the operator input direction, determine whether continued joystick movement in the operator input direction will result in immediate breach of the virtual boundary by the implement; and (iii) when determining that continued joystick movement in the operator input direction will result in imminent or immediate breach of the virtual boundary, command the MRF joystick resistance mechanism to generate a maximum MRF resistance force to substantially halt continued joystick movement in the operator input direction.

9. The work vehicle MRF joystick system of example 8, wherein the controller architecture is further configured to: (i) when determining that continued joystick movement in the operator input direction will not result in immediate breach of the virtual boundary, further determine whether continued joystick movement in the operator input direction will bring the implement into a predetermined proximity of the virtual boundary; and (ii) when determining that continued joystick movement in the operator input direction will bring the implement into a predetermined proximity of the virtual boundary, command the MRF joystick resistance mechanism to generate an MRF resistance force less than the maximum MRF resistance force impeding continued joystick movement in the operator input direction.

10. The work vehicle MRF joystick system of example 1, wherein the controller architecture is configured to: (i) detect joystick movement in an operator input direction; (ii) when detecting joystick movement in the operator input direction, determine whether continued joystick movement in the operator input direction will result in immediate breach of the virtual boundary by the implement; and (iii) when determining that continued joystick movement in the operator input direction will result in immediate breach of the virtual boundary, command the MRF joystick resistance mechanism to generate a detent effect or a pulsating effect as the implement crosses the virtual boundary.

11. The work vehicle MRF joystick system of example 1, wherein the work vehicle includes a boom assembly having a terminal end to which the implement is attached. The controller architecture is configured to: (i) monitor joystick-commanded movement of the boom assembly, and (ii) determine whether continued movement of the joystick in the operator input direction will result in breach of a virtual boundary by the implement based, as least in part, on the joystick-commanded movement of the boom assembly.

12. The work vehicle MRF joystick system of example 11, wherein the virtual boundary includes a virtual ceiling below which the implement is desirably maintained.

13. The work vehicle MRF joystick system of example 12, further including an operator interface coupled to the controller architecture. The controller architecture is configured to location the virtual ceiling based, at least in part, on operator data specifying a ceiling height entered by an operator via the operator interface.

14. The work vehicle MRF joystick system of example 1, wherein the controller architecture is further configured to: (i) estimate a spatial position of an obstacle relative to the work vehicle; and (ii) establish the position of the virtual boundary based, at least in part, on the estimated spatial position of the obstacle such that the virtual boundary is located between the implement and the work vehicle.

15. The work vehicle MRF joystick system of example 1, wherein the controller architecture is configured to command the MRF joystick resistance mechanism to vary the MRF resistance force such that, as the implement nears the virtual boundary, the MRF resistance force increases substantially proportionally to a separation distance between the implement and the virtual boundary.

CONCLUSION

There has thus been described embodiments of an MRF joystick system, which guides joystick-controlled positioning of a work vehicle implement through intelligentlyapplied variations in an MRF-applied force. In various implementations, the MRF joystick system may selectively impede or inhibit joystick motion based upon implement movement relative to one or more virtual boundaries. This, in turn, may assist or guide an operator when manipulating within one or more joysticks to command implement movement with increased precision, improved efficiency, and, in certain instances, with a decrease likelihood of undesired impact between the implement and any nearby obstacles. In embodiments, the virtual boundaries may partially define or border an operational envelope within which the implement is desirably maintained during a particular work task, such as an excavation task. In other implementation is, the virtual boundaries may be generated to conform or substantially conform with a final grade topology or profile desirably imparted to the ground surface over which a work vehicle (e.g., a dozer or motor grader) travels, in which case the virtual boundary or boundaries may be defined utilizing a grade control system onboard the work vehicle (if present). In still other instances, the virtual boundaries may be utilized to set other thresholds defining keep-out areas or regions into which a joystick-controlled implement desirably does not encroach; e.g., as when one or more virtual boundaries are established around buried objects, above-ground structures, or other obstacles, which are desirably protected from inadvertent with an implement attached to a work vehicle operating in proximity of such obstacles.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle magnetorheological fluid (MRF) joystick system for usage onboard a work vehicle equipped with an implement, the work vehicle MRF joystick system comprising:
    a joystick device, comprising:
        a base housing;
        a joystick mounted to the base housing and movable with respect thereto; and
        a joystick position sensor configured to monitor joystick movement relative to the base housing;
    an implement tracking data source configured to track movement of the implement during operation of the work vehicle;
    an MRF joystick resistance mechanism controllable to vary an MRF resistance force impeding joystick movement relative to the base housing; and
    a controller architecture coupled to the MRF joystick resistance mechanism, to the joystick position sensor, and to the implement tracking data source, the controller architecture configured to:
        track movement of the implement relative to a virtual boundary utilizing data provided by the implement tracking data source; and
        command the MRF joystick resistance mechanism to vary the MRF resistance force based, at least in part, on implement movement relative to the virtual boundary.

2. The work vehicle MRF joystick system of claim 1, wherein the work vehicle is equipped with a grade control system; and
    wherein the controller architecture is coupled to the grade control system and is configured to define the virtual boundary utilizing grade target data provided by the grade control system.

3. The work vehicle MRF joystick system of claim 2, wherein the work vehicle comprises a dozer or a motor grader, the implement comprises a blade, and the virtual boundary defines a virtual excavation floor.

4. The work vehicle MRF joystick system of claim 1, wherein the virtual boundary comprises a virtual excavation floor; and
    wherein the controller architecture is further configured to establish a location and an orientation of the virtual excavation floor in a three dimensional (3D) tool space through which the implement moves.

5. The work vehicle MRF joystick system of claim 4, wherein the controller architecture establishes the location of the virtual excavation floor based, at least in part, on an excavation depth setting and a ground height reference point.

6. The work vehicle MRF joystick system of claim 4, wherein the controller architecture establishes the orientation of the virtual excavation floor based, at least in part, on operator input indicating a target grade for an excavation feature desirably created utilizing the implement.

7. The work vehicle MRF joystick system of claim 1, wherein the controller architecture is configured to progressively increase the MRF resistance force with increasing proximity of the implement to the virtual boundary.

8. The work vehicle MRF joystick system of claim 1, wherein the controller architecture is configured to:
    detect joystick movement in an operator input direction;
    when joystick movement in the operator input direction, determine whether continued joystick movement in the operator input direction will result in imminent breach of the virtual boundary by the implement; and
    when determining that continued joystick movement in the operator input direction will result in immediate breach of the virtual boundary, command the MRF joystick resistance mechanism to generate a maximum MRF resistance force to substantially halt continued joystick movement in the operator input direction.

9. The work vehicle MRF joystick system of claim 8, wherein the controller architecture is further configured to:
    when determining that continued joystick movement in the operator input direction will not result in immediate breach of the virtual boundary, further determine whether continued joystick movement in the operator input direction will bring the implement into a predetermined proximity of the virtual boundary; and
    when determining that continued joystick movement in the operator input direction will bring the implement into a predetermined proximity of the virtual boundary, command the MRF joystick resistance mechanism to generate an MRF resistance force less than the maximum MRF resistance force impeding continued joystick movement in the operator input direction.

10. The work vehicle MRF joystick system of claim 1, wherein the controller architecture is configured to:
   detect joystick movement in an operator input direction;
   when detecting joystick movement in the operator input direction, determine whether continued joystick movement in the operator input direction will result in immediate breach of the virtual boundary by the implement; and
   when determining that continued joystick movement in the operator input direction will result in immediate breach of the virtual boundary, command the MRF joystick resistance mechanism to generate a detent effect or a pulsating effect as the implement crosses the virtual boundary.

11. The work vehicle MRF joystick system of claim 1, wherein the work vehicle comprises a boom assembly having a terminal end to which the implement is attached; and
   wherein the controller architecture is configured to:
      monitor joystick-commanded movement of the boom assembly; and
      determine whether continued movement of the joystick in the operator input direction will result in breach of a virtual boundary by the implement based, as least in part, on the joystick-commanded movement of the boom assembly.

12. The work vehicle MRF joystick system of claim 11, wherein the virtual boundary comprises a virtual ceiling below which the implement is desirably maintained.

13. The work vehicle MRF joystick system of claim 12, further comprising an operator interface coupled to the controller architecture; and
   wherein the controller architecture is configured to location the virtual ceiling based, at least in part, on operator data specifying a ceiling height entered by an operator via the operator interface.

14. The work vehicle MRF joystick system of claim 1, wherein the controller architecture is further configured to:
   estimate a spatial position of an obstacle relative to the work vehicle; and
   establish the position of the virtual boundary based, at least in part, on the estimated spatial position of the obstacle such that the virtual boundary is located between the implement and the work vehicle.

15. The work vehicle MRF joystick system of claim 1, wherein the controller architecture is configured to command the MRF joystick resistance mechanism to vary the MRF resistance force such that, as the implement nears the virtual boundary, the MRF resistance force increases substantially proportionally to a separation distance between the implement and the virtual boundary.

16. A work vehicle magnetorheological fluid (MRF) joystick system for usage onboard a work vehicle equipped with an implement, the work vehicle MRF joystick system comprising:
   a joystick device, comprising:
      a base housing;
      a joystick mounted to the base housing and movable with respect thereto; and
      a joystick position sensor configured to monitor joystick movement relative to the base housing;
   an MRF joystick resistance mechanism at least partially integrated into the base housing and controllable to selectively resist movement of the joystick relative to the base housing; and
   a controller architecture coupled to the MRF joystick resistance mechanism and to the joystick position sensor, the controller architecture configured to:
      when detecting operator movement of the joystick in an operator input direction, determine whether continued joystick movement in the operator input direction will result in imminent breach of a first virtual boundary by the implement; and
      when determining that continued joystick movement in the operator input direction will result in imminent breach of the first virtual boundary by the implement, command the MRF joystick resistance mechanism to generate a first MRF resistance force impeding continued joystick movement in the operator input direction.

17. The work vehicle MRF joystick system of claim 16, wherein, following initial generation of the first MRF resistance force, the controller architecture commands the MRF joystick resistance mechanism to remove or lessen the MRF resistance force in response to movement of the joystick in a second direction opposite the operator input direction.

18. The work vehicle MRF joystick system of claim 16, wherein the controller architecture is further configured to:
   when detecting operator movement of the joystick in the operator input direction, determine whether continued joystick movement in the operator input direction will result implement movement into a predetermined proximity of the first virtual boundary; and
   when determining that continued joystick movement in the operator input direction will result implement movement into the predetermined proximity of the first virtual boundary, command the MRF joystick resistance mechanism to generate a second MRF resistance force less than the first MRF resistance force impeding continued joystick movement in the operator input direction.

19. The work vehicle MRF joystick system of claim 18, wherein the controller architecture is further configured to command the MRF joystick resistance mechanism to progressively increase a magnitude of the second MRF resistance force if the implement continues to move toward the first virtual boundary following initial generation of the second MRF resistance force.

20. A work vehicle magnetorheological fluid (MRF) joystick system for usage onboard a work vehicle equipped with an implement, the work vehicle MRF joystick system comprising:
   a joystick device including a joystick rotatable relative to a base housing;
   an MRF joystick resistance mechanism controllable to selectively resist rotation of the joystick relative to the base housing about at least one axis;
   an implement tracking data source configured to track movement of the implement during operation of the work vehicle;
   a controller architecture coupled to the joystick device, to the MRF joystick resistance mechanism, and to the implement tracking data source, the controller architecture configured to:
      when an operator commands movement of the implement utilizing the joystick device, track movement of the implement relative to at least a first virtual boundary; and command the MRF joystick resistance mechanism to vary an MRF resistance force impeding joystick movement in at least one degree of freedom to provide tactile feedback to the operator indicative of a proximity of the implement to the first virtual boundary.

* * * * *